US012771969B2

(12) United States Patent
Kobayashi et al.

(10) Patent No.: US 12,771,969 B2
(45) Date of Patent: Oct. 20, 2026

(54) PHOTOELECTRIC CONVERSION APPARATUS, METHOD OF DRIVING PHOTOELECTRIC CONVERSION APPARATUS, AND EQUIPMENT

(71) Applicant: CANON KABUSHIKI KAISHA, Tokyo (JP)

(72) Inventors: Hideo Kobayashi, Tokyo (JP); Takanori Suzuki, Tokyo (JP); Kazuhiro Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 18/953,858

(22) Filed: Nov. 20, 2024

(65) Prior Publication Data

US 2025/0175723 A1 May 29, 2025

(30) Foreign Application Priority Data

Nov. 29, 2023 (JP) ................................ 2023-201979

(51) Int. Cl.
*H04N 25/78* (2023.01)
*H04N 23/667* (2023.01)
*H04N 25/76* (2023.01)

(52) U.S. Cl.
CPC ........... *H04N 25/78* (2023.01); *H04N 23/667* (2023.01); *H04N 25/7795* (2023.01)

(58) Field of Classification Search
CPC ... H04N 25/78; H04N 23/667; H04N 25/7795
See application file for complete search history.

(56) References Cited

U.S. PATENT DOCUMENTS

| | | | | |
|---|---|---|---|---|
| 2011/0234871 A1* | 9/2011 | Taruki | H04N 25/709 | 348/297 |
| 2013/0147997 A1* | 6/2013 | Naganokawa | H04N 25/78 | 348/302 |
| 2014/0333816 A1* | 11/2014 | Uchida | H03M 1/1019 | 348/308 |
| 2017/0019621 A1* | 1/2017 | Totsuka | H04N 25/616 | |
| 2019/0068906 A1* | 2/2019 | Kobayashi | H04N 25/618 | |
| 2020/0404209 A1* | 12/2020 | Totsuka | H04N 25/778 | |

FOREIGN PATENT DOCUMENTS

| | | |
|---|---|---|
| JP | 2009118035 A | 5/2009 |
| JP | 2013123107 A | 6/2013 |
| JP | 2013251677 A | 12/2013 |
| JP | 2021087200 A | 6/2021 |
| JP | 2022102604 A | 7/2022 |

* cited by examiner

*Primary Examiner* — Jason A Flohre
(74) *Attorney, Agent, or Firm* — Canon U.S.A., Inc. IP Division

(57) ABSTRACT

A method of driving a photoelectric conversion apparatus includes a pixel, an output line, and a current source, the pixel including a photoelectric conversion element, a floating diffusion region, and a transfer transistor, the method including setting the transfer transistor to an on state to transfer the charge to the floating diffusion region at a first timing, completing, at a second timing, a comparison of the pixel signal and a threshold voltage, based on the charge transferred to the floating diffusion region at the first timing and performing a first drive to change a connection state between the pixel and the current source from a conductive state to a non-conductive state between the first timing and the second timing.

17 Claims, 18 Drawing Sheets

PHOTOELECTRIC CONVERSION APPARATUS, METHOD OF DRIVING PHOTOELECTRIC CONVERSION APPARATUS, AND EQUIPMENT

BACKGROUND

Field of the Invention

The present invention relates to a photoelectric conversion apparatus, a method of driving the photoelectric conversion apparatus, and equipment.

Description of the Related Art

Japanese Patent Application Laid-Open No. 2013-251677 discusses a technology that determines a voltage value (signal amplitude value) of a pixel signal output from a pixel, switches an analog-to-digital (AD) conversion gain based on the voltage value (signal amplitude value) of the pixel signal, to perform AD conversion.

There is potential for improving the determination accuracy of the voltage value (signal amplitude value) of the pixel signal in a photoelectric conversion apparatus discussed in Japanese Patent Application Laid-Open No. 2013-251677. Improving the determination accuracy of the voltage value (signal amplitude value) of the pixel signal enables the photoelectric conversion apparatus to output high-quality signals.

SUMMARY

The present disclosure is directed to a method of driving a photoelectric conversion apparatus capable of outputting high-quality signals.

According to an aspect of the present disclosure, a method of driving a photoelectric conversion apparatus includes a pixel, an output line, and a current source, the pixel including a photoelectric conversion element configured to generate a charge based on incident light, a floating diffusion region, and a transfer transistor configured to transfer the charge to the floating diffusion region, the output line being configured to be electrically connected to the pixel and output a pixel signal based on the charge, the current source being configured to be electrically connected to the output line and supply current to the output line, the method including setting the transfer transistor to an on state to transfer the charge to the floating diffusion region at a first timing, completing, at a second timing, a comparison of the pixel signal and a threshold voltage, based on the charge transferred to the floating diffusion region at the first timing, selecting a reference signal for use in analog-to-digital (AD) conversion of the pixel signal based on a result of the comparison, or selecting a gain to be applied to the pixel signal based on the result of the comparison, and performing a first drive to change a connection state between the pixel and the current source from a conductive state to a non-conductive state between the first timing and the second timing.

Further features of the present invention will become apparent from the following description of exemplary embodiments with reference to the attached drawings.

DESCRIPTION OF THE EMBODIMENTS

Figure 1:
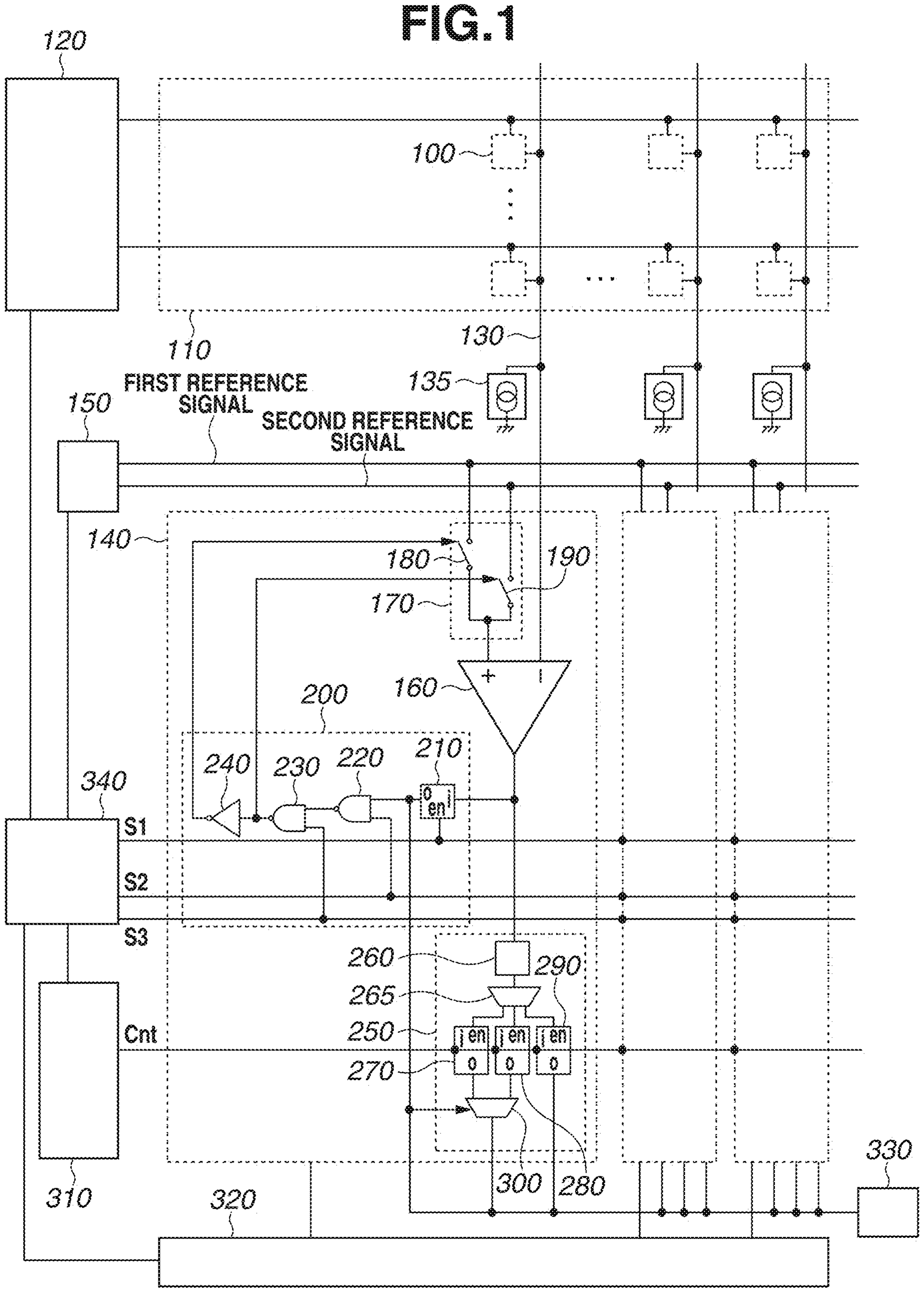
FIG. 1 is a block diagram illustrating a photoelectric conversion apparatus according to one or more aspects of the present disclosure.

Exemplary embodiments will be described below with reference to the drawings. The exemplary embodiments described below are not intended to limit the claimed invention. While the exemplary embodiments describe a plurality of features, not all of the plurality of features are necessarily essential to the invention, and the plurality of features may be combined in any combination. Further, corresponding or similar components are assigned the same reference numeral in the attached drawings, and redundant descriptions thereof are omitted. In each exemplary embodiment described below, mainly a sensor for imaging will be described as an example of photoelectric conversion apparatuses. However, each exemplary embodiment is not limited to sensors for imaging and is also applicable to other examples of photoelectric conversion apparatuses. Examples include imaging apparatuses, distance measurement apparatuses (apparatuses for measuring distances using focus detection or Time of Flight (TOF), and photometric apparatuses (apparatuses for measuring amounts of incident light).

In the present specification, terms that indicate specific directions or positions (e.g., "upper", "lower", "right", "left", and other terms including them) are used as appropriate. These terms are used to facilitate understanding of the exemplary embodiments with reference to the drawings, and the technical scope of the present invention should not be restricted by the definitions of the terms.

In the present specification, when it is stated that "components A and B are electrically connected", this does not necessarily imply a direct connection between the components A and B. For example, the components A and B may be electrically connected with another component C between the components A and B.

A photoelectric conversion apparatus according to a first exemplary embodiment of the present invention will be described below with reference to FIGS. 1 to 5B.

FIG. 1 illustrates an example of a block diagram illustrating the photoelectric conversion apparatus according to the present exemplary embodiment.

As illustrated in FIG. 1, the photoelectric conversion apparatus includes a pixel array portion 110, a vertical scanning circuit 120, output lines 130, current sources 135, signal processing portions 140, and a reference signal output circuit 150. The photoelectric conversion apparatus further includes a counter circuit 310, a horizontal scanning circuit 320, an output circuit 330, and a control circuit 340.

In the pixel array portion 110, a plurality of pixels 100 is arranged in a matrix of a plurality of rows and a plurality of columns. The output lines 130 and the signal processing portions 140 are provided to correspond to the columns in which the pixels 100 are arranged. Each pixel 100 includes a photoelectric conversion element. The photoelectric conversion element generates charges through photoelectric conversion, and the pixel 100 converts the charges generated by the photoelectric conversion element into a voltage signal and outputs the voltage signal to the corresponding output line 130. Specifically, the pixel 100 generates a pixel signal based on the charges and outputs the generated pixel signal to the output line 130 that is electrically connectable to the pixel 100. In FIG. 1, the output lines 130 are output lines that are connected to the plurality of pixels 100 aligned in the vertical direction. The output lines 130 may be, for example, output lines that are connected to the plurality of pixels 100 aligned in the horizontal direction. The current sources 135 are configured to be electrically connected to the output lines 130 and supply current to the output lines 130.

Each signal processing portion 140 includes a comparator 160, a switching portion 170, a selection portion 200, and a memory portion 250. The switching portion 170 includes switches 180 and 190. The pixel signal output from the pixel 100 is input to an input terminal of the comparator 160 included in the corresponding signal processing portion 140 via the corresponding output line 130. The reference signal output circuit 150 outputs a ramp signal VRAMP which is a signal that changes in voltage with time. The output ramp signal VRAMP is input to another input terminal of the comparator 160 via the switching portion 170. The signal processing portions 140 performs analog-to-digital (AD) conversion on the pixel signal, which is an analog signal, using the ramp signal VRAMP and outputs a digital signal.

The ramp signal VRAMP may be generated by the reference signal output circuit 150 or by another circuit different from the reference signal output circuit 150. According to the present exemplary embodiment, the ramp signal VRAMP with a constant slope (amount of change in voltage per unit time) is used. However, the ramp signal VRAMP with a slope that varies at some point may be used. Examples of the ramp signal VRAMP with a slope that varies at some point include a stepwise slope change. The reference signal output circuit 150 is capable of outputting the plurality of different ramp signals VRAMP with different slopes. According to the present exemplary embodiment, the reference signal output circuit 150 outputs the ramp signal VRAMP_L (first reference signal) with a low slope and the ramp signal VRAMP_H (second reference signal) with a high slope.

The memory portion 250 includes a pulse generator 260, a selector circuit 265, a first memory circuit 270, a second memory circuit 280, a third memory circuit 290, and a selector circuit 300.

The selection portion 200 includes a fourth memory circuit 210, Not-AND (NAND) gate circuits 220 and 230, and an inverter (INV) gate circuit 240. The selection portion 200 selects one of the plurality of reference signals.

The comparator 160 outputs a comparison result signal indicating the result of comparing the pixel signal input via the output line 130 and the reference signal to the memory portion 250 and the fourth memory circuit 210. Specifically, in a case where the reference signal is higher in voltage than the pixel signal (in a case where the reference signal is lower in signal amplitude than the pixel signal), the comparator 160 outputs a high level. In a case where the reference signal is lower in voltage than the pixel signal (in a case where the reference signal is higher in signal amplitude than the pixel signal), the comparator 160 outputs a low level. The signal amplitude herein refers to a voltage difference relative to the reference voltage serving as a reference. The reference voltage herein can be considered to be a voltage of a reset-level signal (described below) output from the pixel 100. From another perspective, the reference voltage can be considered to be a power supply voltage that is to be supplied to an amplifying transistor 430 (described below) of the pixel 100. The relationship between the high and low levels at this point is merely an example and may be the inverse. The memory portion 250 and the fourth memory circuit 210 hold a count signal CNT output from the counter circuit 310 (described below) based on changes in signal level of the comparison result signal output from the comparator 160. As an example, the pulse generator 260 generates a short-duration one-shot pulse based on changes in signal level of the comparison result signal output from the comparator 160. The selector circuit 265 supplies the pulse to the first memory circuit 270, the second memory circuit 280, and the third memory circuit 290. Consequently, the count signal CNT of the signal value corresponding to the value of the pixel signal is stored as a digital signal corresponding to the pixel signal in the first memory circuit 270, the second memory circuit 280, and the third memory circuit 290, and the pixel signal output from the pixel 100 undergoes AD conversion.

A digital signal obtained through AD conversion of a reset-level signal (hereinafter, "N signal") of a floating diffusion portion 420 described below is stored in the first memory circuit 270 and the second memory circuit 280. This digital signal contains components of characteristic variation in the signal processing portion 140. A digital signal obtained through AD conversion of a signal (hereinafter, "S signal") obtained by superimposing a signal (photoelectric conversion signal) of a photoelectric conversion element 400 described below on the N signal of the floating diffusion (FD) portion 420 is stored in the third memory circuit 290.

A comparison determination result of a threshold voltage (first reference signal) output from the reference signal output circuit 150 and the pixel signal using the comparator 160 is stored in the fourth memory circuit 210. According to the present exemplary embodiment, the reference signal output circuit 150 outputs a constant signal that does not change in voltage with time when outputting the threshold voltage. Alternatively, the reference signal output circuit 150 may output a signal that changes in voltage with time as the threshold voltage. A circuit that is provided separately from the reference signal output circuit 150 may generate and output the constant signal that does not change in voltage.

The counter circuit 310 outputs the count signal CNT for use in AD conversion to be performed by the signal processing portions 140. The count signal CNT is a signal that counts a clock pulse signal CLK supplied from a clock pulse supply circuit (not illustrated) from the time when the reference signal of the reference signal output circuit 150 begins to change over time. Specifically, the counter circuit 310 counts the clock pulse signal CLK in parallel with the voltage change of the reference signal, generates the count signal CNT, and outputs the generated count signal CNT. While the counter circuit 310 in FIG. 1 is provided to be shared among the signal processing portions 140, the counter circuit 310 may be provided for each of the signal processing portions 140 individually.

The horizontal scanning circuit 320 selects the memory portion 250. The signal held in the selected memory portion 250 is sequentially transferred to the output circuit 330 based on a horizontal scanning signal output from the horizontal scanning circuit 320. The output circuit 330 performs correction processing on the obtained signal and outputs the signal that has undergone the correction processing to the outside of the photoelectric conversion apparatus. For example, a signal obtained by subtracting the digitalized N signal from the digitalized S signal and reducing noise components by the output circuit 330 is output. The vertical scanning circuit 120 performs an operation of sequentially selecting predetermined rows. The control circuit 340 supplies drive signals to the vertical scanning circuit 120, the signal processing portions 140, the reference signal output circuit 150, the counter circuit 310, and the horizontal scanning circuit 320. The control circuit 340 outputs control signals s1, s2, and s3 to the selection portion 200.

Figure 2:
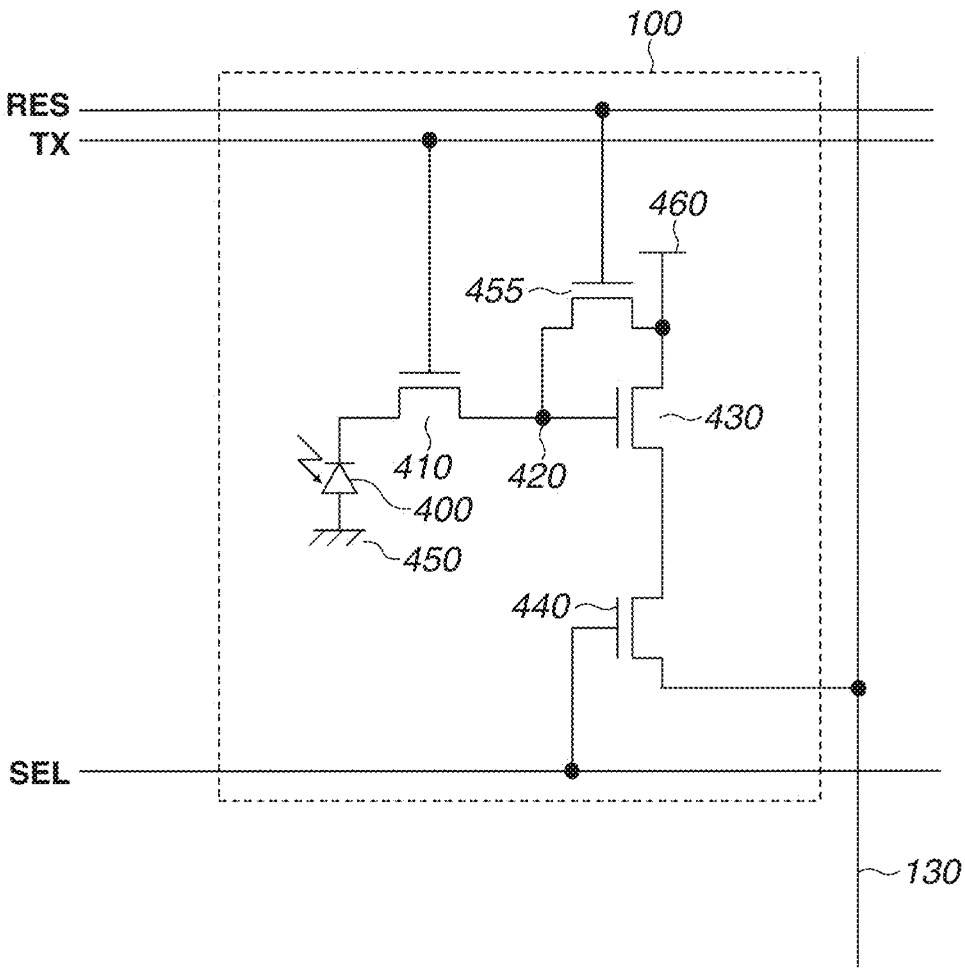
FIG. 2 is a circuit diagram illustrating the photoelectric conversion apparatus according to one or more aspects of the present disclosure.

FIG. 2 illustrates an example of a circuit diagram illustrating the pixel 100 of the photoelectric conversion apparatus according to the present exemplary embodiment.

As illustrated in FIG. 2, the pixel 100 includes the photoelectric conversion element 400, a transfer transistor 410, and the floating diffusion portion 420. In the present specification, the floating diffusion (FD) portion 420 is sometimes referred to also as the FD portion 420. The FD portion 420 is sometimes referred to also as the floating diffusion region 420. The pixel 100 further includes a reset transistor 455 for resetting the FD portion 420, the amplifying transistor 430 for amplifying signals, and a selection transistor 440. The photoelectric conversion element 400 is electrically connected to a ground voltage node 450. The reset transistor 455 and the amplifying transistor 430 are electrically connected to a power supply voltage node 460, and a power supply voltage is supplied to the reset transistor 455 and the amplifying transistor 430. There are cases where no selection transistor 440 is provided. The transfer transistor 410, the reset transistor 455, the amplifying transistor 430, and the selection transistor 440 each may be an N-type metal oxide semiconductor (N-type MOS) transistor or a P-type metal oxide semiconductor (P-type MOS) transistor.

The photoelectric conversion element 400 is, for example, a photodiode. The photoelectric conversion element 400 is not limited to photodiodes and may be, for example, a photoelectric conversion film. The photoelectric conversion element 400 receives light incident on the pixel 100 and generates charges based on the incident light. The reset transistor 455 is driven by a control signal RES. In response to the reset transistor 455 being turning on, the FD portion 420 is reset to a voltage based on the power supply voltage. In response to the reset transistor 455 being turning off, the reset of the FD portion 420 is released. The transfer transistor 410 is driven by a control signal TX. In response to the transfer transistor 410 being turned on, the charges generated by the photoelectric conversion element 400 are transferred to the FD portion 420. The FD portion 420 functions as a charge-to-voltage conversion portion that temporarily stores the charges input from the photoelectric conversion element 400 and converts the stored charges into a voltage signal. The amplifying transistor 430 amplifies the pixel signal converted by the FD portion 420. The selection transistor 440 configured to be electrically connected to the output line 130 is driven by a control signal SEL, connects the amplifying transistor 430 to the output line 130, and outputs the pixel signal amplified by the amplifying transistor 430 to the output line 130. The present disclosure is applicable to both front-illuminated sensors and back-illuminated sensors.

The configuration of the pixel 100 illustrated in FIG. 2 is merely an example, and the pixel 100 may further include a transistor. For example, a transistor for changing a capacitance value of the FD portion 420 and/or a transistor for discharging the charges from the photoelectric conversion element 400 may further be included. The selection transistor 440 may be omitted and the pixel 100 may be switched between a selected state and a non-selected state based on a voltage input from the reset transistor 455 to the FD portion 420.

Figure 3:
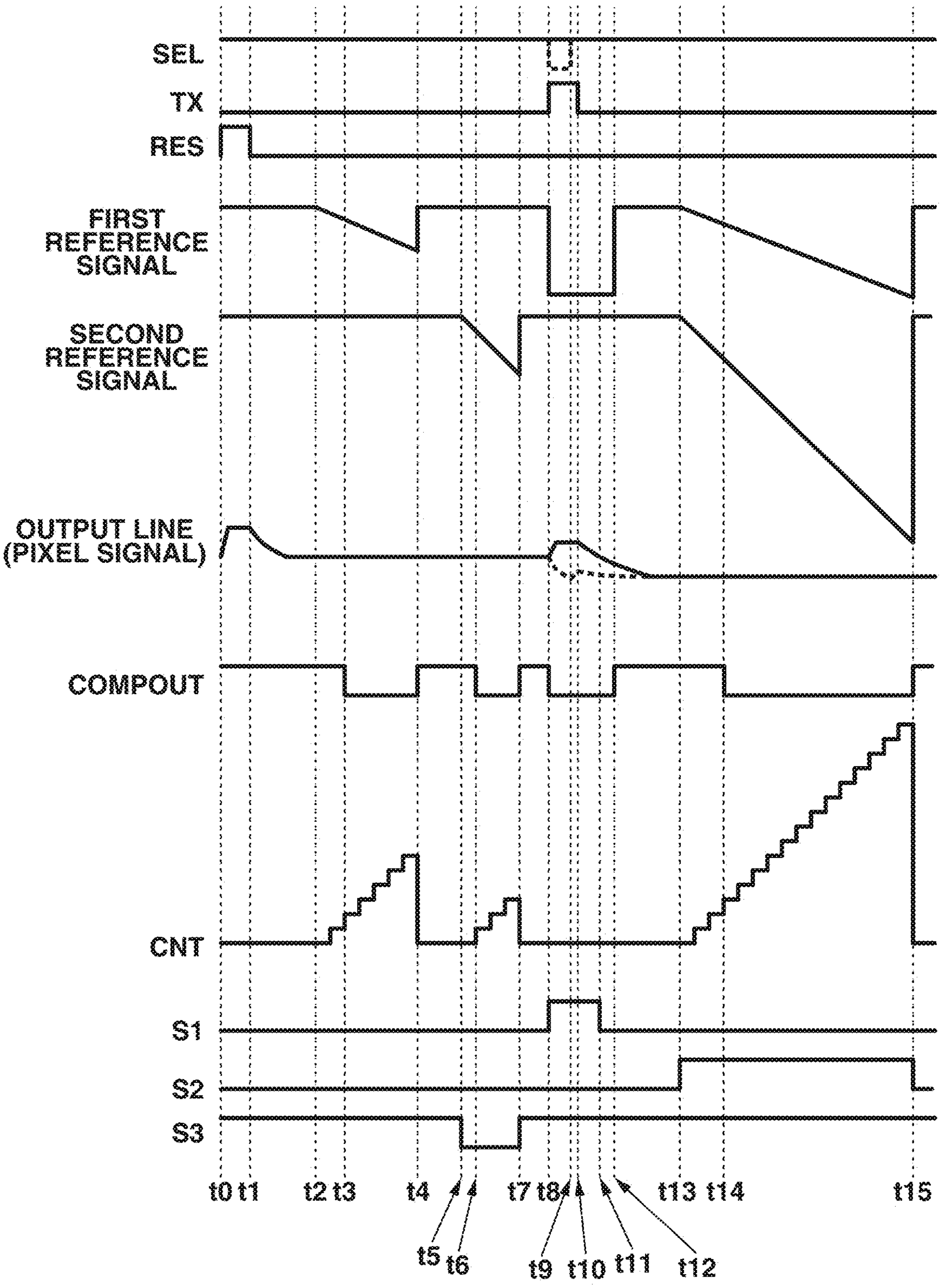
FIG. 3 is a drive timing chart illustrating the photoelectric conversion apparatus according to one or more aspects of the present disclosure.

FIG. 3 illustrates an example of a drive timing chart of the photoelectric conversion apparatus according to the present exemplary embodiment.

In FIG. 3, the horizontal axis represents time, and the vertical axis represents voltage. FIG. 3 schematically illustrates timings of drive pulses, reference signals, a voltage (pixel signal voltage) of the output line 130, and an output voltage (comparator output COMPOUT) of the comparator 160. Control signals illustrated in FIG. 3 correspond to the control signals illustrated in FIGS. 1 and 2. FIG. 3 illustrates a case where low-luminance light is incident on the pixel 100, as an example. A case where the control signal SEL transitions from a high level to a low level at time t8 and transitions from the low level to the high level at time t9 is indicated with a dashed line. A case where the control signal SEL is maintained at the high level at time t8 and time t9 is indicated with a solid line. The latter case will be initially described below.

A period from time t8 to time t11 during which the slope of the ramp signal VRAMP for use in AD conversion is set will be referred to as a first step. A period from time t13 to time t15 during which the S signal is subjected to AD conversion will be referred to as a second step, and a period from time t2 to time t7 during which the N signal is subjected to AD conversion will be referred to as a third step. The operation of transferring the charges from the photoelectric conversion element 400 of the pixel 100 is performed at a plurality of timings, and the first and second steps are performed, for example, between two consecutive timings among the plurality of timings. The third step may also be performed in addition to the first and second steps between the two consecutive timings among the plurality of timings. The cases where the operation of transferring the charges from the photoelectric conversion element of the pixel 100 is performed at a plurality of timings include a case where, for example, the operation is performed once in each of a plurality of frames. The cases where the operation of transferring the charges from the photoelectric conversion element of the pixel 100 is performed at a plurality of timings include a case where, for example, the operation is performed a plurality of times within one frame.

Before time t0, the vertical scanning circuit 120 sets the control signal SEL to a high level and selects a row of the pixels 100 to output pixel signals. At time t0, the vertical scanning circuit 120 sets the control signal RES to a high level and resets the voltage of the FD portion 420. At time t1, the vertical scanning circuit 120 sets the control signal RES to a low level. The pixel signal that is output when the control signal RES is at the low level is an N signal. The N signal is a signal that mainly contains noise components of the pixel 100.

At time t2, the control signal s2 is at a low level, and the control signal s3 is at a high level. Thus, in the switching portion 170, the switch 180 is in an on state, and the switch 190 is in an off state. Thus, the first reference signal is input to the comparator 160.

In a period from time t2 to time t4, the voltage of the ramp signal VRAMP_L is increased from its initial value over time by the reference signal output circuit 150. The reference signal output circuit 150 is capable of outputting the plurality of ramp signals VRAMP with different slopes in parallel and inputting the plurality of ramp signals VRAMP to the signal processing portion 140. Examples of the plurality of ramp signals VRAMP with different slopes include the ramp signal VRAMP_L with a low slope and the ramp signal VRAMP_H with a high slope. In FIG. 3, for example, the ramp signal VRAMP_L is input to the comparator 160 via the switching portion 170.

Thus, during the period from time t2 to time t4, the pixel signal, which is an analog signal, is converted into a digital signal based on a result of comparison of the pixel signal and the ramp signal VRAMP_L. The above-described drive is performed by transmitting control signals from the control circuit 340 to the reference signal output circuit 150 and the switching portion 170.

At time t2, the voltage change of the ramp signal VRAMP_L starts, and the counter circuit 310 starts counting the clock pulse signal CLK and supplies the count signal CNT to the first memory circuit 270 of each column. At time t3, the ramp signal VRAMP_L becomes lower in voltage than the pixel signal, and the signal value of the comparator output COMPOUT output by the comparator 160 changes. The value of the count signal CNT at this time is stored in the first memory circuit 270. The value of the count signal CNT stored in the first memory circuit 270 at this time is a digital value obtained through AD conversion of the N signal using the ramp signal VRAMP_L. At time t4, the voltage change of the ramp signal VRAMP_L over time stops, and the ramp signal VRAMP_L is reset to the state at time t0. The counter circuit 310 stops counting the clock pulse signal CLK and then returns the count signal CNT to the initial value.

At time t5, the control signal s3 transitions from the high level to a low level. Consequently, in the switching portion 170, the switch 180 is set to an off state, and the switch 190 is set to an on state. Thus, the second reference signal is input to the comparator 160.

During a period from time t5 to time t7, the voltage of the ramp signal VRAMP_H increases from its initial value over time under the control of the reference signal output circuit 150. The reference signal output circuit 150 is capable of outputting the plurality of ramp signals VRAMP with different slopes in parallel and inputting the plurality of ramp signals VRAMP to the signal processing portions 140. In FIG. 3, for example, the ramp signal VRAMP_H is input to the comparator 160 via the switching portion 170. Thus, during the period from time t2 to time t7, the pixel signal, which is an analog signal, is converted into a digital signal based on a result of comparison of the pixel signal and the ramp signal VRAMP_H. The above-described drive is performed by transmitting control signals from the control circuit 340 to the reference signal output circuit 150 and the switching portion 170.

At time t5, the voltage change of the ramp signal VRAMP_H starts, and the counter circuit 310 starts counting the clock pulse signal CLK and supplies the count signal CNT to the second memory circuit 280 of each column. At time t6, the ramp signal VRAMP_H becomes lower in voltage than the pixel signal, and the signal value of the comparator output COMPOUT output by the comparator 160 changes. The value of the count signal CNT at this time is stored in the second memory circuit 280. The value of the count signal CNT stored in the second memory circuit 280 at this time is a digital value obtained through AD conversion of the N signal using the ramp signal VRAMP_H. At time t7, the voltage change of the ramp signal VRAMP_H over time stops, and the ramp signal VRAMP_H is reset to the state at time t0. The counter circuit 310 stops counting the clock pulse signal CLK and then returns the count signal CNT to the initial value.

According to the present exemplary embodiment, the AD conversion of the N signal is performed using both the ramp signals VRAMP_L and VRAMP_H. However, the AD conversion of the N signal may be performed using only either the ramp signals VRAMP_L or VRAMP_H. In such a case, use of the ramp signal VRAMP_L as a reference signal makes it possible to perform AD conversion with high resolution, because the amount of change in voltage per unit time is less than that in the case where the ramp signal VRAMP_H is used.

At time t7, the control signal s3 transitions from the low level to the high level. Consequently, in the switching portion 170, the switch 180 is set to the on state, and the switch 190 is set to the off state. Thus, the first reference signal is input to the comparator 160.

At time t8, the control signal TX is set to a high level, and at time t10, the control signal TX is set to a low level. Consequently, the charges generated based on the light incident on the photoelectric conversion element 400 are transferred to the FD portion 420. The amplifying transistor 430 outputs a voltage signal based on the charges transferred to the FD portion 420. This voltage signal is output to the output line 130 via the selection transistor 440, and the pixel signal is input to an input terminal of the comparator 160. This signal is an S signal that is one of the pixel signals. The S signal is an analog signal having a voltage corresponding to the amount of light received by the photoelectric conversion element 400 during one frame period. Immediately after the control signal TX is set to the high level, the voltage of the FD portion 420 increases due to the coupling of the line that outputs the control signal TX and the FD portion 420 via a gate-source parasitic capacitor of the transfer transistor 410. In a case where low-luminance light is incident on the photoelectric conversion element 400, the amount of voltage increase described above exceeds the amount of voltage decrease of the FD portion 420 due to the charges transferred from the photoelectric conversion element 400 to the FD portion 420. Thus, the voltage of the FD portion 420 increases temporarily, and accordingly, the voltage of the output line 130 also increases. At time t10, when the control signal TX is set to the low level, the voltage of the FD portion 420 decreases due to the coupling of the line that outputs the control signal TX and the FD portion 420, and the voltage of the output line 130 stabilizes to the voltage value corresponding to the S signal.

During a period from time t8 to time t12, the reference signal output circuit 150 inputs a threshold voltage VREF serving as the first reference signal to another input terminal of the comparator 160. The threshold voltage VREF is output by the reference signal output circuit 150 and is input to the comparator 160 via the switching portion 170. The threshold voltage VREF is used as a threshold for determining which one of the ramp signals VRAMP_L and VRAMP_H is to be selected as a ramp signal for AD conversion of the pixel signal.

During the period from time t8 to time t11, the comparator 160 compares the threshold voltage VREF and the pixel signal. In a case where the voltage of the pixel signal is higher than the threshold voltage VREF (case where the pixel signal is lower in signal amplitude than the threshold voltage VREF), the comparator output COMPOUT is changed from the high level to the low level. The comparator output COMPOUT based on a result of comparison of the threshold voltage VREF and the pixel signal is input to the selection portion 200. The selection portion 200 then controls the switching portion 170 to select the ramp signal VRAMP_L and inputs the selected ramp signal VRAMP_L to the comparator 160. In the case where the pixel signal is higher in voltage than the threshold voltage VREF (case where the signal amplitude is low), the ramp signal VRAMP_L with a low slope is used in AD conversion. More specifically, the ramp signal VRAMP_L (first reference signal) is used in the second step based on the comparison result obtained in the first step.

In a case where the voltage of the pixel signal is lower than the threshold voltage VREF (case where the pixel signal is higher in signal amplitude than the threshold voltage VREF), the comparator output COMPOUT remains at the high level. The comparator output COMPOUT based on a result of comparison of the threshold voltage VREF and the pixel signal is input to the selection portion 200. The selection portion 200 controls the switching portion 170 to select the ramp signal VRAMP_H and inputs the selected ramp signal VRAMP_H to the comparator 160. In a case where the voltage of the pixel signal is lower than the threshold voltage VREF (case where the signal amplitude is higher), the ramp signal VRAMP_H with a higher slope than the slope of the ramp signal VRAMP_L is used in AD conversion. More specifically, the ramp signal VRAMP_H (second reference signal) is used in the second step based on the comparison result obtained in the first step.

The above-described drive method makes it possible to perform AD conversion with an appropriate resolution for the signal output level of the pixel signal. Specifically, the drive method makes it possible to achieve a high dynamic range and high-speed driving. FIG. 3 illustrates a case where the voltage of the pixel signal based on low-luminance light is higher than the threshold voltage VREF and the ramp signal VRAMP_L is used in the second step.

In this case, at time t8, the control signal s1 transitions from a low level to a high level, and at time t11, the control signal s1 transitions from the high level to the low level. Consequently, during the period from time t8 to time t11, the value of the comparator output COMPOUT is stored in the fourth memory circuit 210.

At time t11, whether the ramp signals VRAMP_H (second reference signal) or VRAMP_L (first reference signal) is to be used is determined in the AD conversion period of the S signal, and at time t12, the voltage of the reference signal is reset.

At time t13, the control signal s2 transitions from a low level to a high level. Consequently, the comparison result stored in the fourth memory circuit 210 is input to the switching portion 170. In FIG. 3, since the value of the low level is stored in the fourth memory circuit 210, in the switching portion 170, the switch 180 is set to the on state, and the switch 190 is set to the off state. Thus, the first reference signal is input to the comparator 160.

During the period from time t13 to time t15, the reference signal output circuit 150 increases the voltage of the ramp signal VRAMP_L or VRAMP_H from the initial value over time. The pixel signal and the ramp signal VRAMP_L or VRAMP_H are compared. Furthermore, the pixel signal is converted into a digital signal based on the comparison result. Whether the ramp signals VRAMP_L or VRAMP_H is to be input to the comparator 160 by each signal processing portion 140 is determined based on the value of the comparator output COMPOUT between time t8 and time t11. In the case of FIG. 3, if, for example, the voltage of the pixel signal during the period from time t8 to time t11 is higher than the threshold voltage VREF, the ramp signal VRAMP_L with a low slope is selected.

At time t13, the voltage change of the ramp signal VRAMP_L or VRAMP_H starts, and the counter circuit 310 starts counting the clock pulse signal CLK and supplies the count signal CNT to the third memory circuit 290 of each column.

At time t14, the voltage of the ramp signal VRAMP_L or VRAMP_H falls below the pixel signal, and the signal value of the comparator output COMPOUT changes. The value of the count signal CNT at this time is stored in the third memory circuit 290. The value of the count signal CNT stored at this time in the third memory circuit 290 is a digital value obtained through AD conversion of the S signal.

At time t15, the voltage change of the ramp signal VRAMP_L or VRAMP_H over time stops, and the ramp signal VRAMP_L or VRAMP_H is reset to the state at time t0. The counter circuit 310 stops counting the clock pulse signal CLK and then returns the count signal CNT to the initial value.

After time t15, the signal processing portion 140 is sequentially operated based on a horizontal scanning signal output from the horizontal scanning circuit 320, thus transmitting the signals stored in the first memory circuit 270 and the second memory circuit 280 to the output circuit 330. After time t15, the signal processing portion 140 is sequentially operated based on a horizontal scanning signal output from the horizontal scanning circuit 320, thus transmitting the signals held in the third memory circuit 290 and the fourth memory circuit 210 to the output circuit 330. In the case of FIG. 3, the selector circuit 300 transmits the signal that is stored in the first memory circuit 270 and is selected using the signal stored in the fourth memory circuit 210 to the output circuit 330.

The output circuit 330 calculates a differential signal level (light component) by subtracting the digitalized N signal from the digitalized S signal. The calculated signal is output to the outside of the photoelectric conversion apparatus. The output circuit 330 may perform different arithmetic processes on the signals transmitted from the fourth memory circuit 210. For example, the output circuit 330 may assign different gains to the signals based on the slope ratio between the ramp signals VRAMP_L and VRAMP_H. The output circuit 330 may perform a process of correcting an offset difference resulting from the start timing of the slope operation of the ramp signal VRAMP and/or a signal propagation delay.

As described above, in a case where the pixel signal based on low-luminance light is output, the ramp signal VRAMP_L with a lower slope is selected, and AD conversion is performed, thus reducing random noise caused by quantization errors and performing AD conversion with high accuracy.

In the above-describe drive, the value of the comparator output COMPOUT is stored in the fourth memory circuit 210 during the period from time t8 to time t11, so that a voltage error in the output line 130 at time t11 can affect the comparison result of the voltage of the pixel signal and the threshold voltage VREF. On the other hand, in a case where the control signal SEL transitions from the high level to the low level at time t8, the selection transistor 440 is set to the off state in FIG. 2. Thus, as indicated with the dashed line in FIG. 3, the voltage of the output line 130 decreases due to a current sink operation of the current source 135. This makes it possible to improve the accuracy of determining the magnitude of the voltage value (signal amplitude value) of the pixel signal.

As illustrated in FIG. 3, errors in the voltage of the output line 130 at time t11 are reduced more in the case of the dashed line than in the case of the solid line. In other words, the voltage of the output line 130 at time t11 is closer to a final steady value in the case of the dashed line than in the case of the solid line. The above-described drive that temporarily sets the control signal SEL to the low level and the selection transistor 440 to the off state makes it possible to decrease the voltage of the output line 130 using the current sink operation of the current source 135. This makes it possible to improve the accuracy of comparing the voltage of the pixel signal and the threshold voltage VREF.

The timing at which the control signal TX transitions from the low level to the high level will be referred to as a first timing (time t8). The timing at which the comparison of the pixel signal and the threshold voltage based on the signal charges transferred to the floating diffusion region 420 at the first timing is completed is referred to as a second timing (time t11). Specifically, a first drive of changing the connection state between the pixel 100 and the current source 135 from a connected state to a non-connected state is performed between the first timing and the second timing, which makes it possible to improve the determination accuracy and output high-quality signals.

Figure 4:
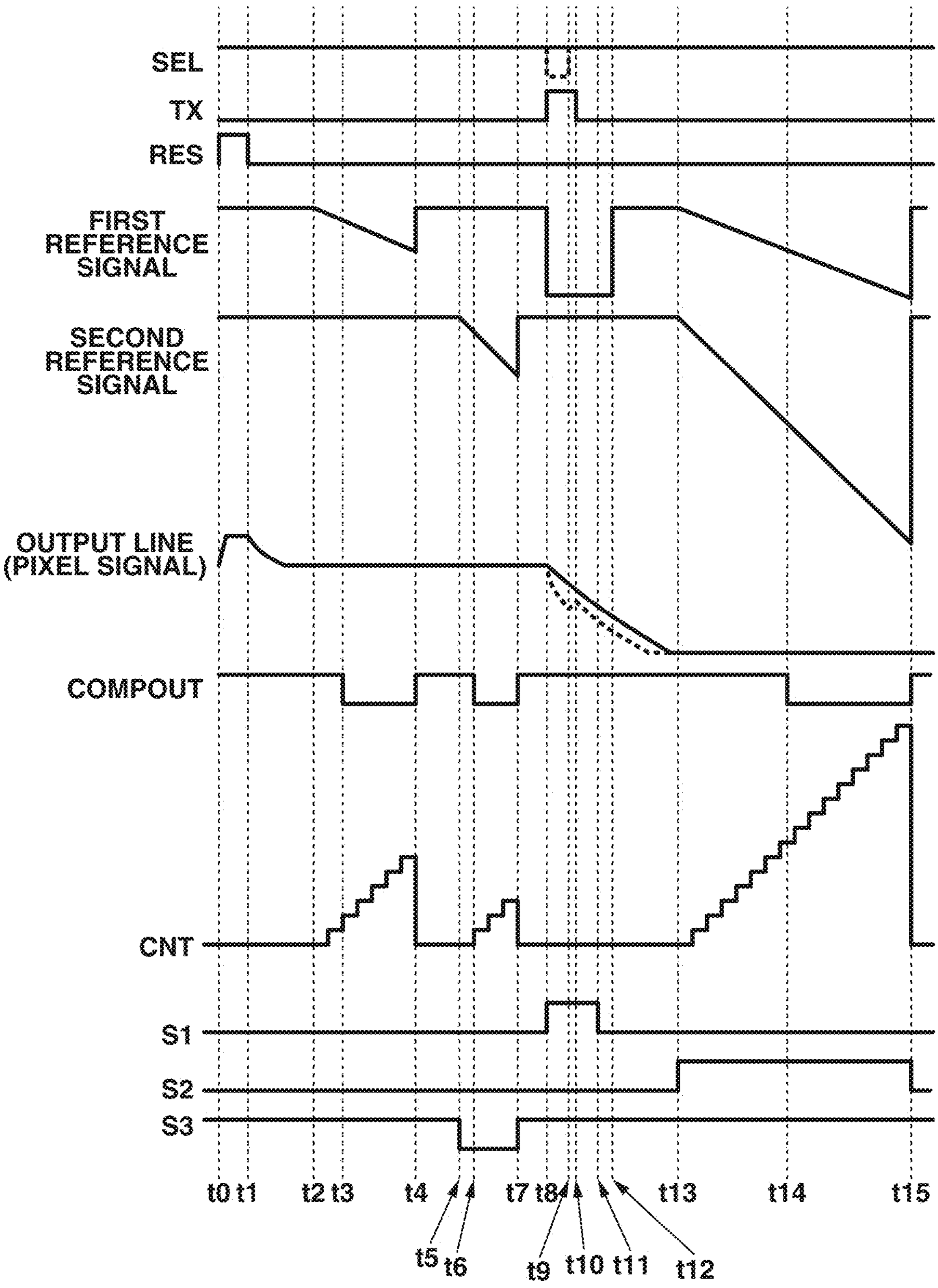
FIG. 4 is a drive timing chart illustrating the photoelectric conversion apparatus according to one or more aspects of the present disclosure.

FIG. 4 illustrates an example of a drive timing chart of the photoelectric conversion apparatus according to the present exemplary embodiment. Each element that is similar to an element in FIG. 3 is assigned the same reference numeral, and descriptions of each drive that is similar to a drive in FIG. 3 are sometimes omitted or simplified.

In FIG. 4, the horizontal axis represents time, and the vertical axis represents voltage. FIG. 4 schematically illustrates timings of drive pulses, reference signals, the voltage (pixel signal voltage) of the output line 130, and the output voltage (comparator output COMPOUT) of the comparator 160. The control signals illustrated in FIG. 4 correspond to the control signals illustrated in FIGS. 1 and 2. FIG. 4 illustrates a case where high-luminance light is incident on the pixel 100, as an example. A case where the control signal SEL transitions from the high level to the low level at time t8 and transitions from the low level to the high level at time t9 is indicated with a dashed line. A case where the control signal SEL is maintained at the high level at time t8 and time t9 is indicated with a solid line.

FIG. 4 differs from FIG. 3 in that charges generated based on not low-luminance light but high-luminance light are transferred to the FD portion 420 when the control signal TX is set to the high level at time t8. Thus, the voltage of the pixel signal based on the high-luminance light is lower than the threshold voltage VREF, and the ramp signal VRAMP_H (second reference signal) is used in the second step. In a case where the pixel signal based on the high-luminance light is output, the ramp signal VRAMP_H with a higher slope is selected, and AD conversion is performed. The foregoing drive makes it possible to reduce the pixel signal reading time.

While random noise caused by quantization errors increases, since photon shot noise is dominant during the incidence of high-luminance light, the random noise has a relatively low effect.

In FIG. 4, immediately after the control signal TX is set to the high level at time t8, the voltage of the FD portion 420 increases due to the coupling of the line that outputs the control signal TX and the FD portion 420. However, in a case where high-luminance light is incident on the photoelectric conversion element 400, the amount of voltage decrease of the FD portion 420 due to the charges transferred from the photoelectric conversion element 400 to the FD portion 420 exceeds the amount of voltage increase described above. Thus, after time t8, as the voltage of the FD portion 420 decreases, the voltage of the output line 130 also decreases and is stabilized to the voltage value corresponding to the S signal.

In FIG. 4, as in FIG. 3, a voltage error in the output line 130 at time t11 may affect a comparison result of the voltage of the pixel signal and the threshold voltage VREF. In a case where the control signal SEL transitions from the high level to the low level at time t8, the selection transistor 440 is set to the off state in FIG. 2. Thus, as indicated with the dashed line in FIG. 4, the current sink operation of the current source 135 decreases the voltage of the output line 130. This makes it possible to improve the accuracy in determination of the magnitude of the voltage value (signal amplitude value) of the pixel signal.

As illustrated in FIG. 4, errors in the voltage of the output line 130 at time t11 are reduced more in the case of the dashed line than in the case of the solid line. In other words, the voltage of the output line 130 at time t11 is closer to a final steady value in the case of the dashed line than in the case of the solid line. The above-described drive that temporarily sets the control signal SEL to the low level and the selection transistor 440 to the off state makes it possible to decrease the voltage of the output line 130 through the current sink operation of the current source 135. This makes it possible to improve the accuracy of comparing the voltage of the pixel signal and the threshold voltage VREF.

The timing at which the control signal TX transitions from the low level to the high level will be referred to as the first timing (time t8). The timing at which the comparison of the pixel signal and the threshold voltage based on the signal charges transferred to the floating diffusion region 420 at the first timing is completed is referred to as the second timing (time t11). Specifically, a first drive of changing the connection state between the pixel 100 and the current source 135 from a connected state to a non-connected state is performed between the first timing and the second timing, which makes it possible to improve the determination accuracy and output high-quality signals.

FIGS. 3 and 4 illustrate examples in which the control signal SEL transitions from the high level to the low level during the period in which the control signal TX is set to the high level. However, the examples are not limitations. For example, in FIGS. 3 and 4, the control signal SEL may transition from the high level to the low level between time t10, at which the control signal TX is set to the low level, and time t11, at which the determination of the magnitude of the voltage value of the pixel signal is completed. In other words, the control signal SEL is set to the low level during the period from the time at which the control signal TX is set to the high level to the time at which the determination is completed, so that the above-described effect is achieved. The overlap of the period during which the control signal SEL is set at the low level and the period during which the control signal TX is at the high level makes it possible to prevent the voltage of the output line 130 from temporarily increasing as the voltage of the FD portion 420 increases, thus producing a higher advantageous effect. The timing at which the control signal TX transitions from the high level to the low level is referred to as a third timing.

Figure 5A:
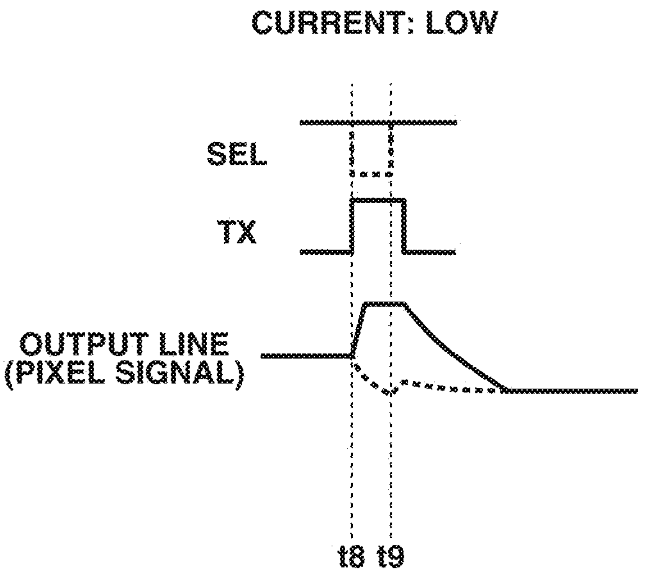
FIGS. 5A and 5B are drive timing charts illustrating the photoelectric conversion apparatus according to one or more aspects of the present disclosure.
Figure 5B:
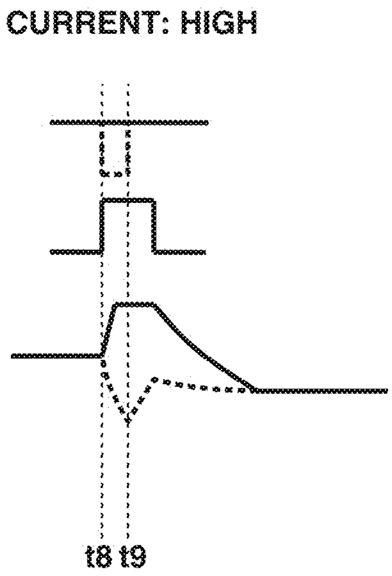

The period during which the control signal SEL is at the low level may be changed for each operation mode. For example, in an operation mode in which the current of the current source 135 is high, the period during which the control signal SEL is maintained at the low level may be reduced. FIGS. 5A and 5B illustrate examples.

FIGS. 5A and 5B illustrate examples of drive timing charts of the photoelectric conversion apparatus according to the present exemplary embodiment. Each element that is similar to an element in FIGS. 3 and 4 is assigned the same reference numeral, and descriptions of each drive that is similar to a drive in FIGS. 3 and 4 are sometimes omitted or simplified.

In FIGS. 5A and 5B, the horizontal axis represents time, and the vertical axis represents voltage. FIGS. 5A and 5B schematically illustrate timings of drive pulses and the voltage (pixel signal voltage) of the output line 130. Control signals illustrated in FIG. 4 correspond to the control signals illustrated in FIGS. 1 and 2. FIG. 5A illustrates a first operation mode in which a first current flows through the current source 135, and FIG. 5B illustrates a second operation mode in which a second current higher than the first current flows through the current source 135. FIGS. 5A and 5B illustrate a case where low-luminance light is incident on the pixel 100, as an example. A case where the control signal SEL transitions from the high level to the low level at time t8 and transitions from the low level to the high level at time t9 is indicated with a dashed line. A case where the control signal SEL is maintained at the high level at time t8 and time t9 is indicated with a solid line.

As compared to FIG. 5A, the rate of decrease in the voltage of the output line 130 is fast during a period from time t8 to time 9 in which the control signal SEL is at the low level in FIG. 5B. Thus, in a case where, for example, the period during which the control signal SEL is kept at the low level is set to approximately the same in FIGS. 5A and 5B, the time for the voltage of the output line 130 to be stabilized to the voltage value corresponding to the S signal may vary between different operation modes. Specifically, the time for the voltage of the output line 130 to be stabilized to the voltage value corresponding to the S signal is longer in the second operation mode in which the current of the current source is higher than in the first operation mode in which the current of the current source is low. Thus, in FIGS. 5A and 5B, the period during which the control signal SEL is kept at the low level is set to relatively short in the second operation mode in which the current is high, thus controlling the time for stabilization of the output line 130 to be approximately the same even in different operation modes. Specifically, optimal processing is performed for different operation modes to improve the accuracy in determination of the magnitude of the voltage value (signal amplitude value) of the pixel signal, thus outputting high-quality signals.

A method other than changing the current value of the current source 135 may be used to switch the operation mode. For example, the plurality of comparators 160 configured to be electrically connected to one output line 130 may be provided, and the operation mode may be switched by changing the number of comparators 160 that are electrically connected to one output line 130. For example, in a case where the plurality of comparators 160 is connected to one output line 130, the capacitance associated with the output line 130 increases. Thus, the rate of decrease in the voltage of the output line 130 during the period in which the control signal SEL is at the low level slows down. In the above-described case, the period during which the control signal SEL is at the low level is set longer in the operation mode with a greater number of comparators 160 connected to one output line 130, so that the time for stabilization of the output line 130 is controlled to be approximately the same even in different operation modes.

Setting the control signal SEL to the low level in FIG. 3 causes the selection transistor 440 to be set to the off state in FIG. 2, so that the current supplied from the power supply voltage node 460 is reduced to zero. This may cause variations in the power supply voltage of the pixel array portion 110 in FIG. 1. If the variations propagate to the comparator 160, the accuracy in determination of the voltage value (signal amplitude value) of the pixel signal may decrease. Therefore, it is desirable that the power supply of the pixel array portion 110 and the power supply of the comparator 160 be provided as separate systems and be input from different input pads. In other words, an electrical path for supplying the power supply voltage to the power supply of the pixel array portion 110 is separated from an electrical path for supplying the power supply voltage to the element that performs the determination of the voltage value (signal amplitude value) of the pixel signal, so that the determination accuracy improves.

A photoelectric conversion apparatus according to a first modified example of the first exemplary embodiment of the present invention will be described below with reference to FIG. 6. Each component that is similar to a component according to the first exemplary embodiment is assigned the same reference numeral, and descriptions of the components are sometimes omitted or simplified.

The first modified example of the first exemplary embodiment differs from the first exemplary embodiment in that a layered structure in which the pixel array portion 110 and the signal processing portions 140 are arranged on separate substrates is employed. FIG. 6 illustrates an example of a block diagram illustrating the photoelectric conversion apparatus according to the present modified example.

Figure 6:
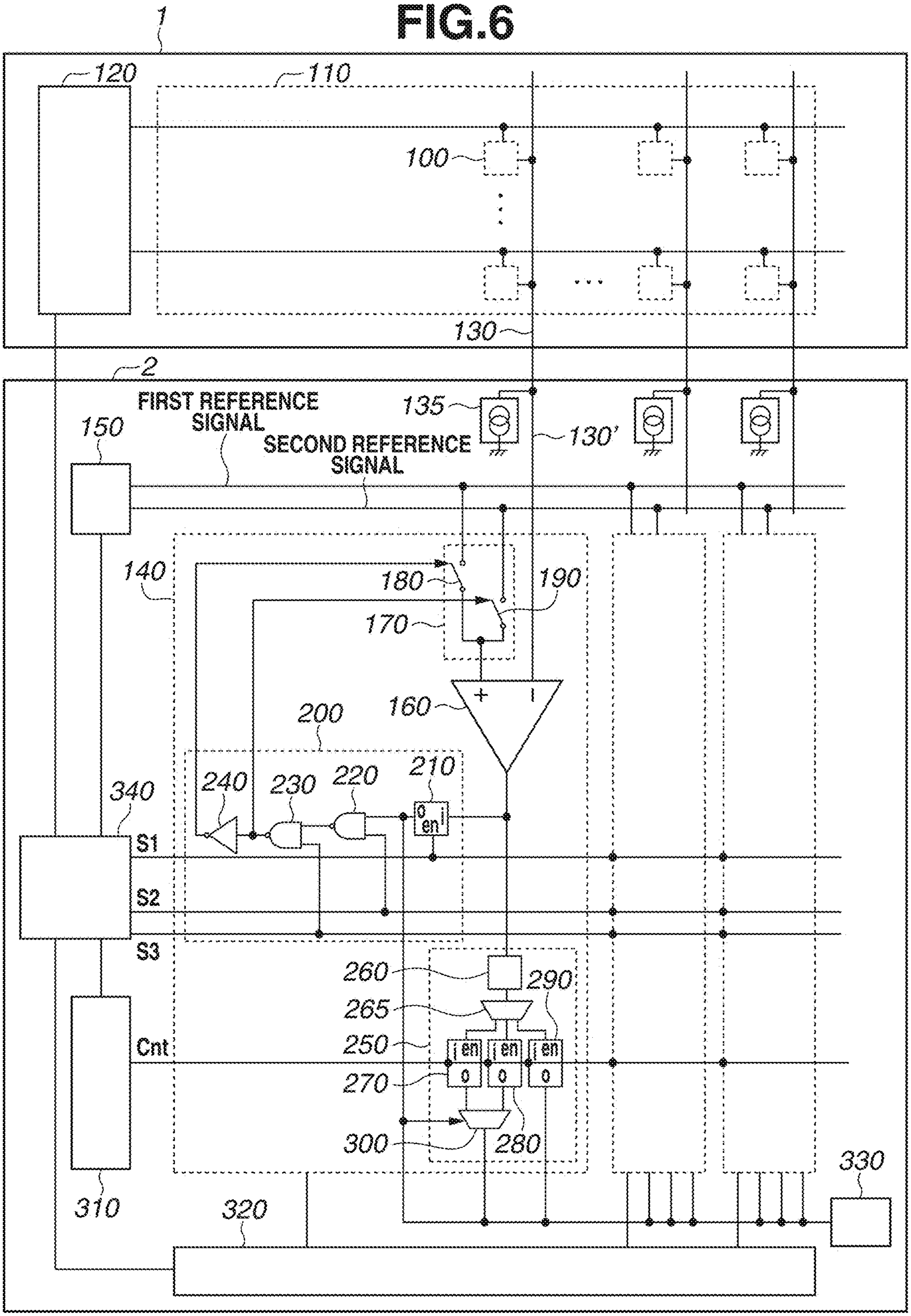
FIG. 6 is a block diagram illustrating a photoelectric conversion apparatus according to a first modified example of one or more aspects of the present disclosure.

As illustrated in FIG. 6, a pixel substrate 1 includes the pixel array portion 110, the vertical scanning circuit 120, and the output lines 130. A circuit substrate 2 includes the output lines 130', the current sources 135, the signal processing portions 140, the reference signal output circuit 150, the counter circuit 310, the horizontal scanning circuit 320, the output circuit 330, and the control circuit 340.

The present modified example makes it possible to optimize a manufacturing process by applying a process specialized for pixels to the pixel substrate 1 and applying a process specialized for circuits to the circuit substrate 2.

A photoelectric conversion apparatus according to a second modified example of the first exemplary embodiment of the present invention will be described below with reference to FIGS. 7 and 8. Each component that is similar to a component according to the first exemplary embodiment is assigned the same reference numeral, and descriptions of the components are sometimes omitted or simplified.

The second modified example of the first exemplary embodiment differs from the first exemplary embodiment in that switches are provided between the pixels 100 and the current sources 135. FIG. 7 illustrates an example of a block diagram illustrating the photoelectric conversion apparatus according to the present modified example.

Figure 7:
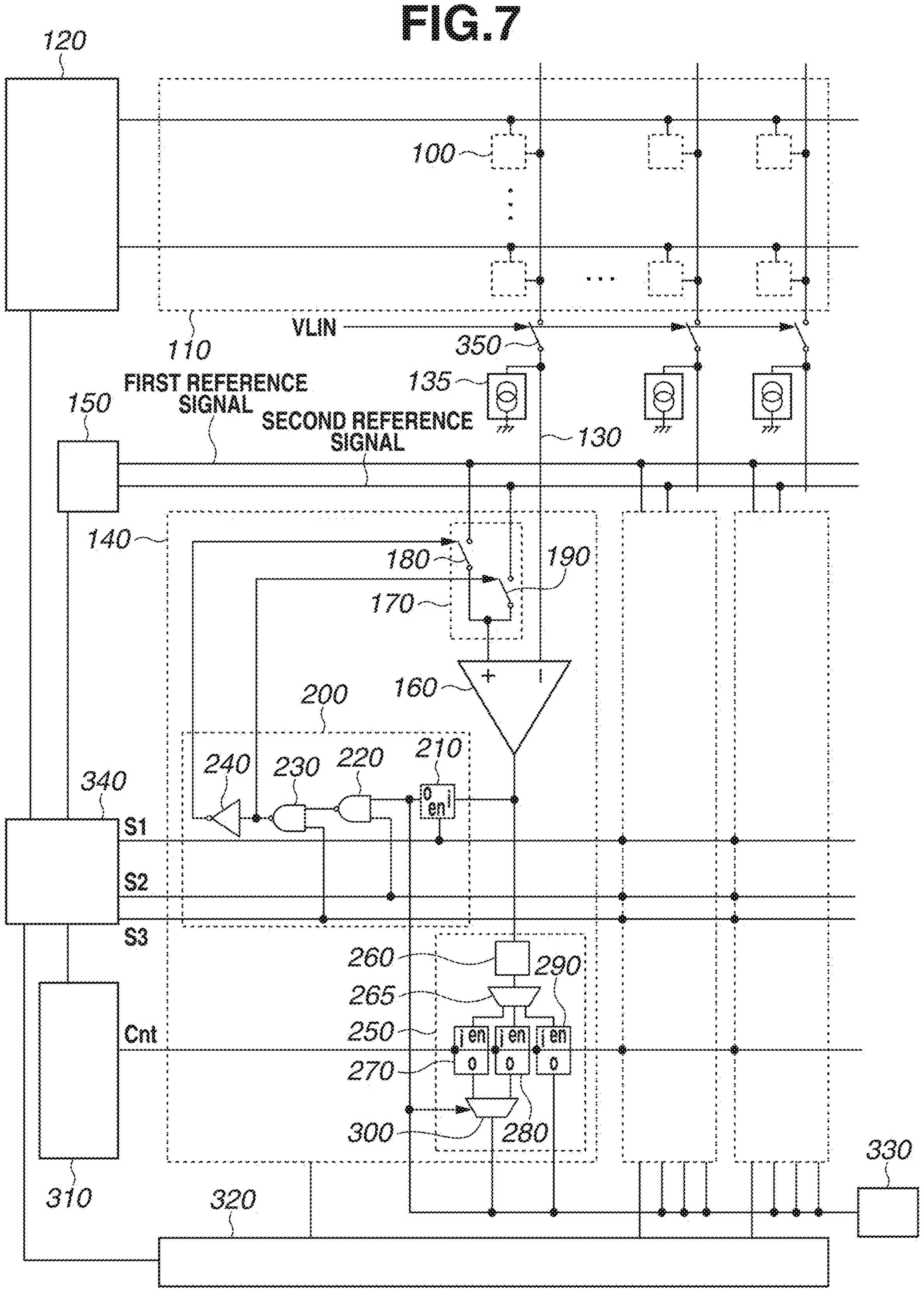
FIG. 7 is a block diagram illustrating a photoelectric conversion apparatus according to a second modified example of one or more aspects of the present disclosure.

As illustrated in FIG. 7, the photoelectric conversion apparatus includes switches 350. Each of the switches 350 is provided between the respective pixel 100 and the corresponding current source 135. The switches 350 are driven by a control signal VLIN. The present modified example performs a drive similar to the drive according to the first exemplary embodiment using the switches 350 instead of the selection transistor 440.

Figure 8:
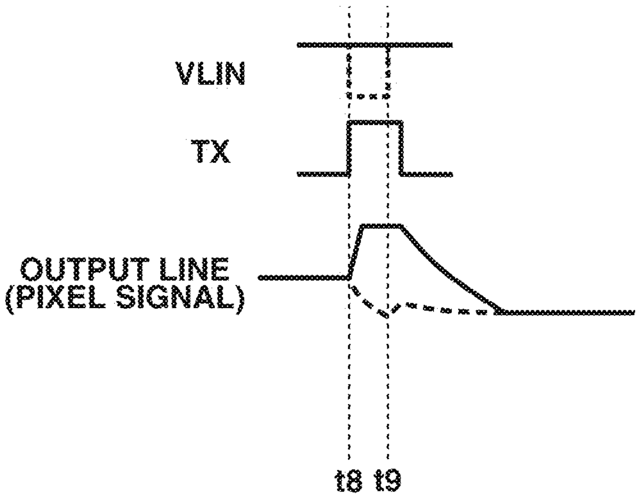
FIG. 8 is a drive timing chart illustrating the photoelectric conversion apparatus according to the second modified example of one or more aspects of the present disclosure.

FIG. 8 illustrates an example of a timing chart of the photoelectric conversion apparatus according to the present modified example.

In FIG. 8, the horizontal axis represents time, and the vertical axis represents voltage. FIG. 8 schematically illustrates timings of drive pulses and the voltage (pixel signal voltage) of the output line 130. The control signals illustrated in FIG. 8 correspond to the control signals illustrated in FIGS. 1, 2, and 7. FIG. 8 illustrates a case where low-luminance light is incident on the pixel 100, as an example. A case where the control signal VLIN transitions from a high level to a low level at time t8 and transitions from the low level to the high level at time t9 is indicated with a dashed line. A case where the control signal VLIN is maintained at the high level at time t8 and time t9 is indicated with a solid line.

In the case where the control signal VLIN transitions from the high level to the low level at time t8, the switch 350 is set to the off state in FIG. 7. Thus, as indicated with the dashed line in FIG. 8, the voltage of the output line 130 decreases due to the current sink operation of the current source 135. This makes it possible to improve the accuracy of determining the magnitude of the voltage value (signal amplitude value) of the pixel signal and output high-quality signals.

A photoelectric conversion apparatus according to a third modified example of the first exemplary embodiment of the present invention will be described below with reference to FIGS. 9 and 10. Each component that is similar to a component according to the first exemplary embodiment is assigned the same reference numeral, and descriptions of the components are sometimes omitted or simplified.

According to the second modified example of the first exemplary embodiment, in one output line corresponding to one current source, a switch is provided between a pixel and a current source. According to the third modified example of the first exemplary embodiment, in contrast to this, in two output lines corresponding to one current source, a switch is provided between each pixel and the current source. FIG. 9 illustrates an example of a circuit diagram illustrating the photoelectric conversion apparatus according to the present modified example.

Figure 9:
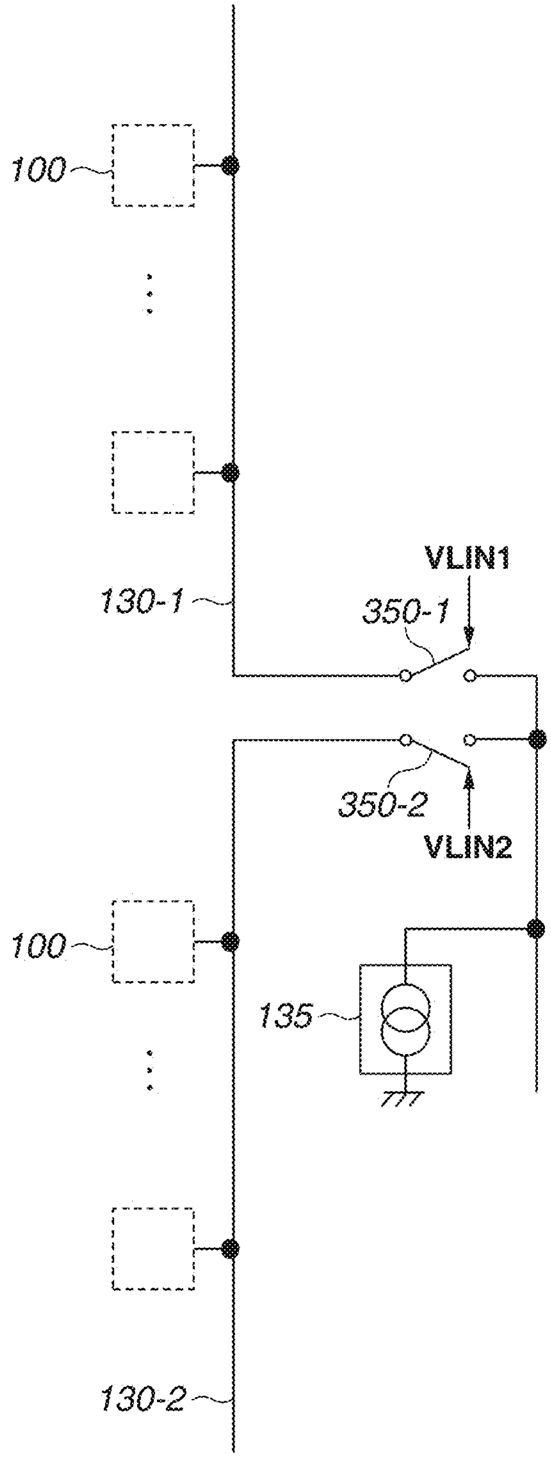
FIG. 9 is a circuit diagram illustrating a photoelectric conversion apparatus according to a third modified example of one or more aspects of the present disclosure.

As illustrated in FIG. 9, the photoelectric conversion apparatus includes output lines 130-1 and 130-2 and switches 350-1 and 350-2. The output lines 130-1 and 130-2 are configured to be electrically connected to the pixels 100. The switch 350-1 is provided between a pixel 100 and the current source 135 and is configured to be electrically connected to the pixel 100 via the output line 130-1. The switch 350-2 is provided between another pixel 100 and the current source 135 and is configured to be electrically connected to the other pixel 100 via the output line 130-2. The switch 350-1 is driven by a control signal VLIN1, and the switch 350-2 is driven by a control signal VLIN2.

Figure 10:
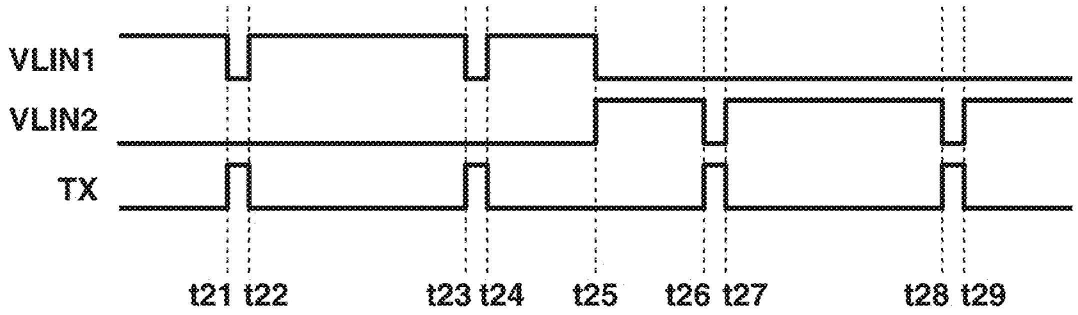
FIG. 10 is a drive timing chart illustrating the photoelectric conversion apparatus according to the third modified example of one or more aspects of the present disclosure.

FIG. 10 illustrates an example of a timing chart of the photoelectric conversion apparatus according to the present modified example.

In FIG. 10, the horizontal axis represents time, and the vertical axis represents voltage. FIG. 10 schematically illustrates timings of drive pulses. The control signals illustrated in FIG. 10 correspond to the control signals illustrated in FIGS. 1, 2, and 9. During a period from time t1 to time t5, the output line 130-1 is read, and during a period from time t5, the output line 130-2 is read.

In FIG. 10, the control signal TX is set at the high level during periods from time t21 to time t22, from time t23 to time t24, from time t26 to time t27, and from time t28 to time 29. During a period from time t21 to time t25, the control signal VLIN1 is set at the high level to read the output line 130-1. However, during that period, the control signal VLIN1 is set at the low level during the periods from time t21 to time t22 and from time t23 to time t24. During a period from time t25, the control signal VLIN2 is at the high level to read the output line 130-2. However, during that period, the control signal VLIN2 is at the low level during periods from time t25 to time t26 and from time t27 to time t28. Such a drive sets the switch 350-1 or 350-2 to the off state during the period in which the control signal TX is set at the high level. This configuration improves the accuracy in determining the magnitude of the voltage value (signal amplitude value) of the pixel signal, resulting in a high-quality signal output. Furthermore, sequentially reading the two output lines 130-1 and 130-2 instead of one output line 130 reduces the parasitic capacitance of the output lines in pixel signal reading, thus improving the operation speed. The present modified example makes it possible to improve not only the determination accuracy but also the operation speed using the switch 350-1 or 350-2.

A second exemplary embodiment of the present invention will be described below. A photoelectric conversion apparatus according to the second exemplary embodiment will be described below with reference to FIGS. 11 and 12. Each component that is similar to a component according to the first exemplary embodiment is assigned the same reference numeral, and descriptions of the components are sometimes omitted or simplified.

Figure 11:
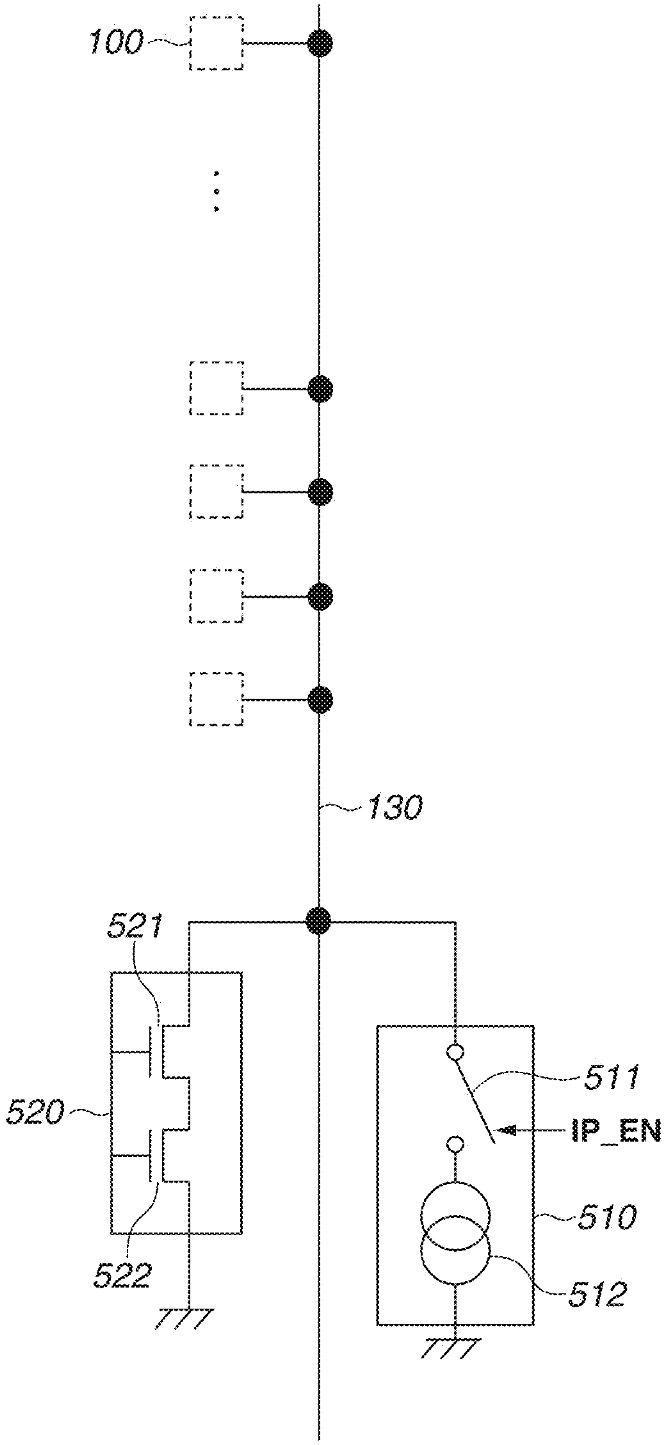
FIG. 11 is a circuit diagram illustrating a photoelectric conversion apparatus according to one or more aspects of the present disclosure.

The present exemplary embodiment differs from the first exemplary embodiment in that a pulse current source is included as an accelerating circuit. FIG. 11 illustrates an example of a circuit diagram illustrating the photoelectric conversion apparatus according to the present exemplary embodiment.

As illustrated in FIG. 11, the photoelectric conversion apparatus includes a pulse current source 510 and a current source 520. The pulse current source 510 includes a switch 511 and a current source 512. The current source 512 is configured to be electrically connected to the output line 130, and the switch 511 is provided between the output line 130 and the current source 512. The switch 511 is driven by a control signal IP_IN. The current source 520 includes a cascode transistor 521 and a current source transistor 522.

Figure 12:
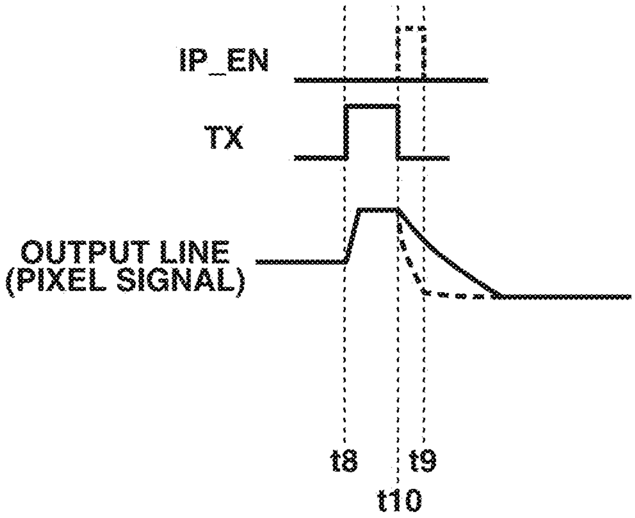
FIG. 12 is a drive timing chart illustrating the photoelectric conversion apparatus according to one or more aspects of the present disclosure.

FIG. 12 illustrates an example of a timing chart of the photoelectric conversion apparatus according to the present exemplary embodiment.

In FIG. 12, the horizontal axis represents time, and the vertical axis represents voltage. FIG. 12 schematically illustrates timings of drive pulses and the voltage (pixel signal voltage) of the output line 130. The control signals illustrated in FIG. 12 correspond to the control signals illustrated in FIGS. 1, 2, and 11. FIG. 12 illustrates a case where low-luminance light is incident on the pixel 100, as an example. A case where the control signal IP_IN transitions from a low level to a high level at time t10 and transitions from the high level to the low level at time t9 is indicated with a dashed line. A case where the control signal VLIN is maintained at the low level at time t10 and time t9 is indicated with a solid line.

Setting the control signal TX to the high level at time t8 may temporarily increase the voltage of the output line 130 in the case of outputting the pixel signal based on low-luminance light, as in the first exemplary embodiment. Setting the control signal TX to the low level at time t10 may decrease the voltage of the output line 130.

In a case where the control signal VLIN transitions from the low level to the high level at time t10, the switch 511 is set to the on state in FIG. 11. The sink current in the output line 130 increases in accordance with the amount of current from the current source 512. Thus, as indicated with the dashed line in FIG. 12, the current sink operation accelerates the decrease in voltage of the output line 130. Specifically, the connection state between the accelerating circuit and the output line 130 is changed from a non-conductive state to a conductive state between the first timing and the second timing, so that the output line 130 outputs the pixel signal to the comparator 160 as the accelerating circuit operates.

As described above, after the signal processing is accelerated using the pulse current source 510 as an accelerating circuit, the magnitude of the voltage value (signal amplitude value) of the pixel signal is determined, which makes it possible to improve the determination accuracy and output high-quality signals.

A third exemplary embodiment of the present invention will be described below. A photoelectric conversion apparatus according to the third exemplary embodiment will be described below with reference to FIG. 13. Each component that is similar to a component according to the first and second exemplary embodiments is assigned the same reference numeral, and descriptions of the components are sometimes omitted or simplified.

Figure 13:
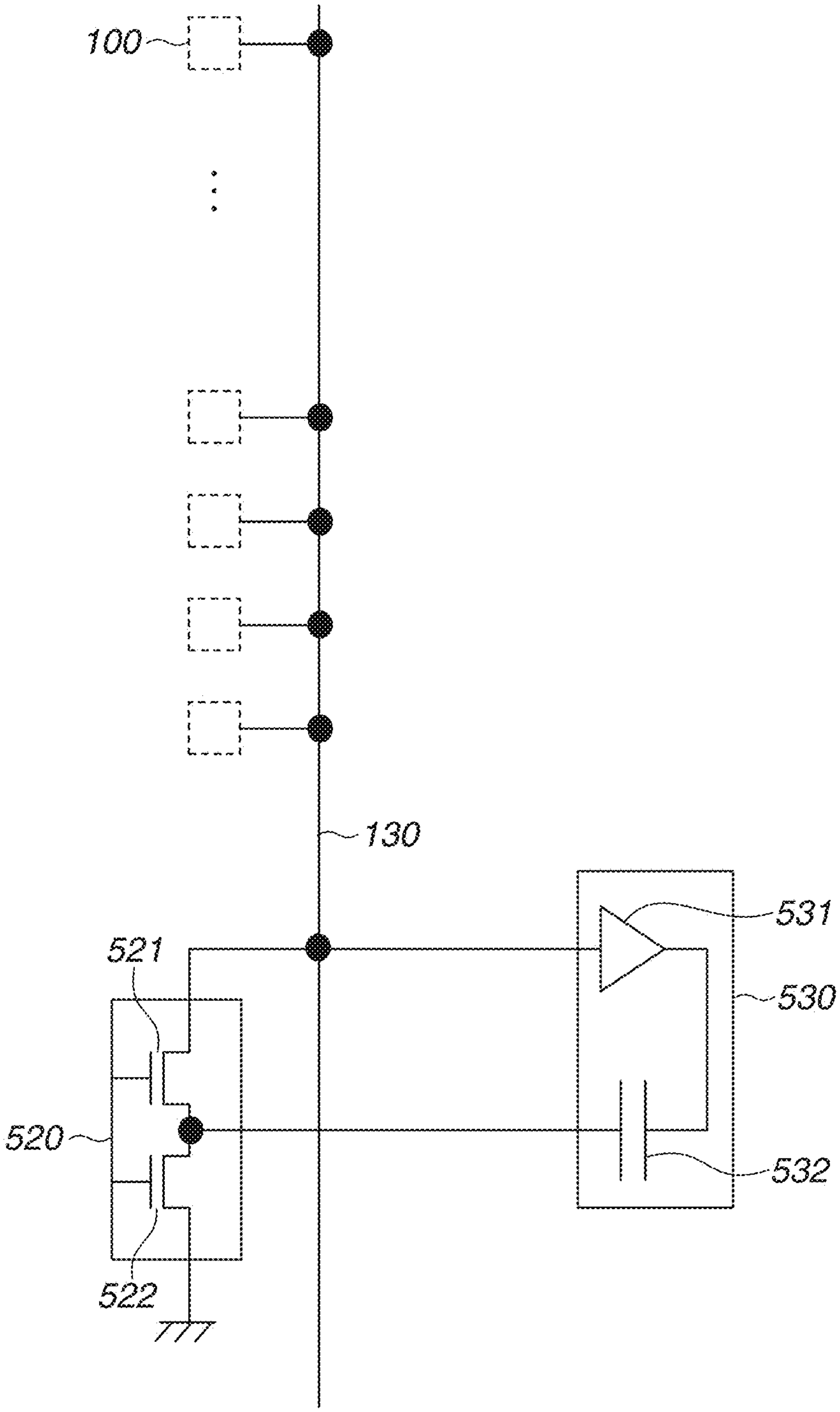
FIG. 13 is a circuit diagram illustrating a photoelectric conversion apparatus according to one or more aspects of the present disclosure.

The present exemplary embodiment differs from the first and second exemplary embodiments in that a negative capacitance circuit is included as an accelerating circuit. FIG. 13 illustrates an example of a circuit diagram illustrating the photoelectric conversion apparatus according to the present exemplary embodiment.

As illustrated in FIG. 13, the photoelectric conversion apparatus includes a negative capacitance circuit 530. The negative capacitance circuit 530 includes an amplifier 531 and a capacitive element 532. The capacitive element 532 is configured to be electrically connected to the output line 130, and the amplifier 531 is provided between the output line 130 and the capacitive element 532.

Use of the negative capacitance circuit 530 enables acceleration of the signal processing. Under certain conditions, the negative capacitance circuit 530 functions as a capacitance of −(A×C), where A is the gain of the amplifier 531, and C is the capacitance of the capacitive element 532. More specifically, between the first timing and the second timing, the output line 130 outputs a pixel signal to the comparator 160 as the accelerating circuit operates.

Such a drive effectively reduces the capacitance associated with the output line 130, so that the negative capacitance circuit 530 functions as an accelerating circuit, thus achieving acceleration of the signal processing. After the signal processing is accelerated, the magnitude of the voltage value (signal amplitude value) of the pixel signal is determined, which makes it possible to improve the determination accuracy and output high-quality signals.

A fourth exemplary embodiment of the present invention will be described below. A photoelectric conversion apparatus according to the fourth exemplary embodiment will be described below with reference to FIGS. 14 and 15. Each component that is similar to a component according to the first, second, and third exemplary embodiments is assigned the same reference numeral, and descriptions of the components are sometimes omitted or simplified.

Figure 14:
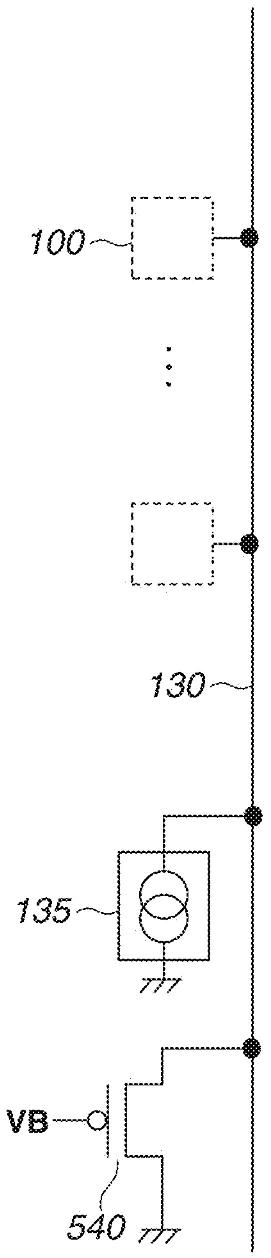
FIG. 14 is a circuit diagram illustrating a photoelectric conversion apparatus according to one or more aspects of the present disclosure.

The present exemplary embodiment differs from the first, second, and third exemplary embodiments in that a restriction circuit is included. FIG. 14 illustrates an example of a circuit diagram illustrating the photoelectric conversion apparatus according to the present exemplary embodiment.

As illustrated in FIG. 14, the photoelectric conversion apparatus includes a clipping transistor 540. The clipping transistor 540 functions as a restriction circuit and restricts a range within which the voltage of the output line 130 is allowed to vary.

Figure 15:
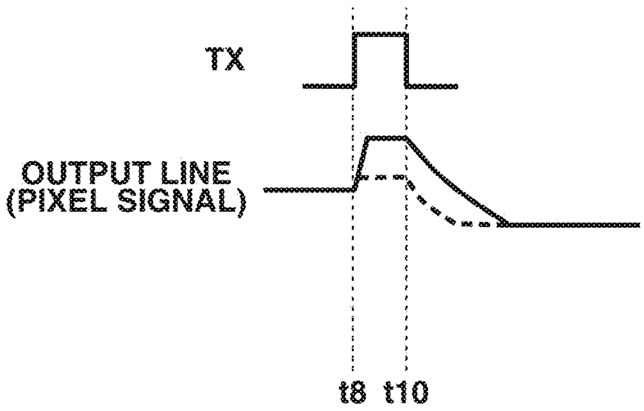
FIG. 15 is a drive timing chart illustrating the photoelectric conversion apparatus according to one or more aspects of the present disclosure.

FIG. 15 illustrates an example of a timing chart of the photoelectric conversion apparatus according to the present exemplary embodiment.

In FIG. 15, the horizontal axis represents time, and the vertical axis represents voltage. FIG. 15 schematically illustrates timings of drive pulses and the voltage (pixel signal voltage) of the output line 130. The control signals illustrated in FIG. 15 correspond to the control signals illustrated in FIGS. 1 and 2. FIG. 15 illustrates a case where low-luminance light is incident on the pixel 100, as an example. A case where the clipping transistor 540 is included is indicated with a dashed line. A case where the clipping transistor 540 is not included is indicated with a solid line.

By setting the control signal TX to the high level at time t8, the voltage of the output line 130 may temporarily increase in the case of outputting the pixel signal based on low-luminance light, as in the first exemplary embodiment. Setting the control signal TX to the low level at time t10 decreases the voltage of the output line 130.

In the case where the clipping transistor 540 is included, the clipping transistor 540 transitions from a non-operating state to an operating state when the voltage of the output line 130 reaches a predetermined value during the period from time t8 to time t10, and the increase in the voltage of the output line 130 is controlled. Specifically, the state of the restriction circuit changes from the non-operating state to the operating state between the first timing and the second timing.

Thus, determining the magnitude of the voltage value (signal amplitude value) of the pixel signal after control of the increase in the voltage of the output line 130 using the clipping transistor 540 improves the determination accuracy, resulting in high-quality signal output. While the configuration including the clipping transistor 540 as a restriction circuit is described above, this is not a limiting example. The restriction circuit may be any circuit that restricts the range within which the voltage of the output line 130 is allowed to vary and, for example, a configuration of a clipping portion 109 based on any of the exemplary embodiments discussed in Japanese Patent Application Laid-Open No. 2021-87200 is also applicable.

A fifth exemplary embodiment of the present invention will be described below. A photoelectric conversion apparatus according to the fifth exemplary embodiment of the present invention will be described below with reference to FIG. 16. Each component that is similar to a component according to the first, second, third, and fourth exemplary embodiments is assigned the same reference numeral, and descriptions of the components are sometimes omitted or simplified.

Figure 16:
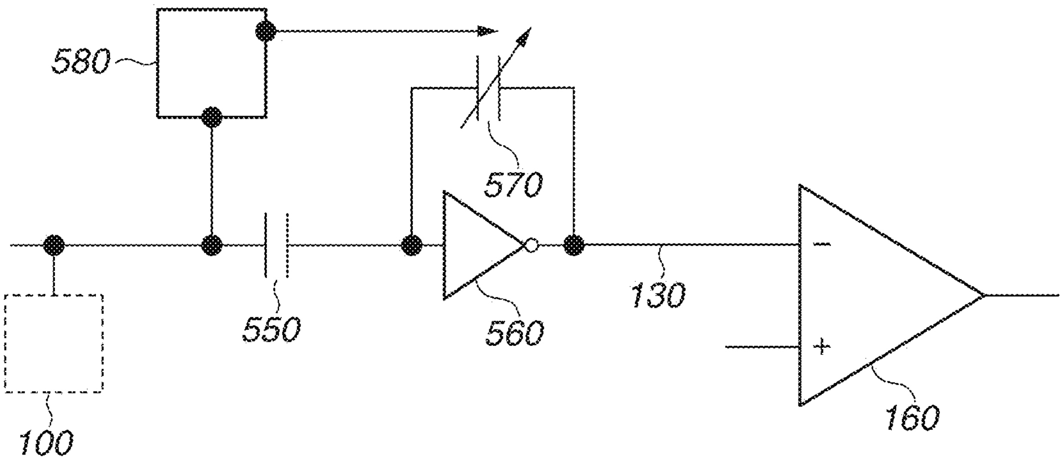
FIG. 16 is a circuit diagram illustrating a photoelectric conversion apparatus according to one or more aspects of the present disclosure.

The present exemplary embodiment differs from the first to fourth exemplary embodiments in that the gain amount that is applied to the pixel signal is optimized instead of optimizing the reference signal based on a result of determination of the magnitude of the voltage value (signal amplitude value) of the pixel signal. FIG. 16 illustrates an example of a circuit diagram illustrating the photoelectric conversion apparatus according to the present exemplary embodiment.

As illustrated in FIG. 16, the photoelectric conversion apparatus includes a capacitive element 550, an amplifier 560, a variable capacitor 570, and a determination circuit 580. The amplifier 560 is provided between the pixel 100 and the comparator 160. The determination circuit 580 determines the magnitude of the voltage value (signal amplitude value) of the pixel signal, and the variable capacitor 570 is controlled based on the determination result. The gain amount that is applied to the pixel signal output from the pixel 100 is determined based on the ratio between the capacitive element 550 and the variable capacitor 570. More specifically, the gain amount to be applied to the pixel signal that is input to the comparator 160 can be made variable based on the result of determination of the magnitude of the voltage value (signal amplitude value) of the pixel signal.

The fifth exemplary embodiment is applicable to any of the first to fourth exemplary embodiments. With this configuration, it is still possible to improve the determination accuracy and output high-quality signals by using a drive that interrupts the path from the pixel 100 to the current source 135 or using the accelerating circuit or the restriction circuit.

A sixth exemplary embodiment of the present invention will be described below. A photoelectric conversion apparatus according to the fifth exemplary embodiment will be described below with reference to FIG. 17. Each component that is similar to a component according to the first to fifth exemplary embodiments is assigned the same reference numeral, and descriptions of the components are sometimes omitted or simplified.

Figure 17:
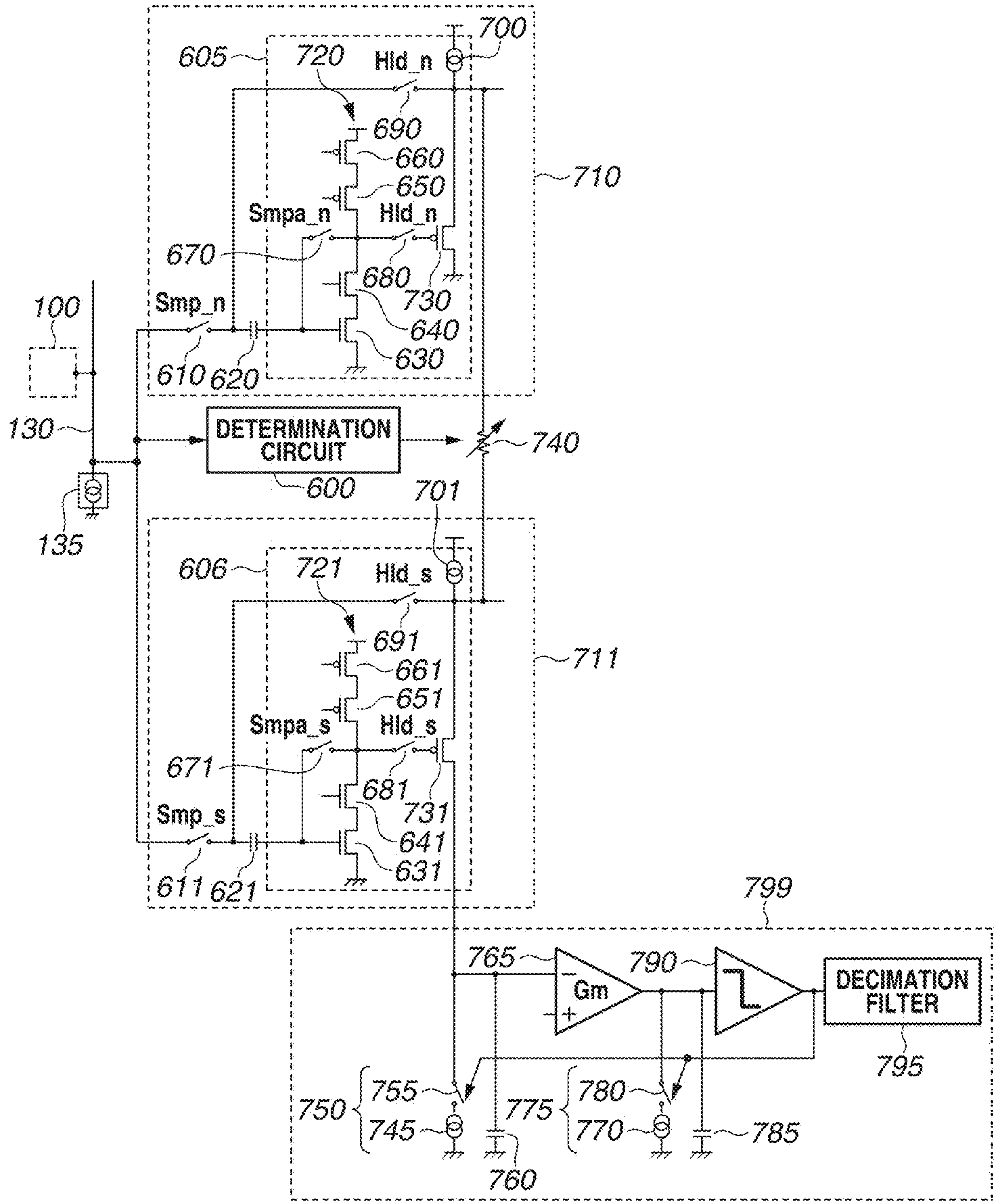
FIG. 17 is a circuit diagram illustrating a photoelectric conversion apparatus according to one or more aspects of the present disclosure.

The present exemplary embodiment differs from the first to fifth exemplary embodiments in that delta-sigma (ΔΣ) type AD conversion is performed instead of slope-type AD conversion. FIG. 17 illustrates an example of a circuit diagram illustrating the photoelectric conversion apparatus according to the present exemplary embodiment.

As illustrated in FIG. 17, the photoelectric conversion apparatus includes a determination circuit 600, a first sample-and-hold circuit 710, a second sample-and-hold circuit 711, and a conversion portion 799. The determination circuit 600, the first sample-and-hold circuit 710, the second sample-and-hold circuit 711, and the conversion portion 799 are arranged to correspond to the output line 130. As described below, the first sample-and-hold circuit 710 samples and stores the N signal that is output from the pixel 100 when the photoelectric conversion element 400 is reset, and stores the sampled N signal. The second sample-and-hold circuit 711 samples the S signal that is generated based on incident light on the photoelectric conversion element 400 and stores the sampled S signal.

The first sample-and-hold circuit 710 includes a capacitive element 620 and an inverting amplifier 605.

A switch 610 controls the connection between the output line 130 and the capacitive element 620 based on a control signal Smp_n. The inverting amplifier 605 may include a combination of a source-grounded circuit and source follower circuit. The inverting amplifier 605 includes transistors 630, 640, 650, 660, and 730, switches 670, 680, and 690, and a current source 700. The switch 670 is connected between the input and output of the source-grounded circuit that may include the transistors 630, 640, 650, and 660 and is controlled by a control signal Smpa_n. Signals from the inverting amplifier 605 can be output based on a control signal Hld_n.

The second sample-and-hold circuit 711 has a similar configuration to the first sample-and-hold circuit 710. The second sample-and-hold circuit 711 includes a capacitive element 621 and an inverting amplifier 606. A switch 611 controls the connection between the output line 130 and the capacitive element 621 based on the control signal Smp_n. The inverting amplifier 606 may include a combination of a source-grounded circuit and a source follower circuit. The inverting amplifier 606 includes transistors 631, 641, 651, 661, and 731, switches 671, 681, and 691, and a current source 701.

The switch 671 is connected between the input and output of the source-grounded circuit that may include the transistors 631, 641, 651, and 661 and is controlled by the control signal Smpa_n. Signals from the inverting amplifier 606 can be output based on the control signal Hld_n.

A variable resistor element 740 is arranged between an output terminal of the first sample-and-hold circuit 710 and an output terminal of the second sample-and-hold circuit 711. A case where the first sample-and-hold circuit 710 outputs the N signal and the second sample-and-hold circuit 711 outputs the S signal will be discussed below. A current I flowing through the variable resistor element 740 is expressed by the following Equation 1, where Vn is the potential of the output terminal of the first sample-and-hold circuit 710, specifically, the potential of the N signal, Vs is the potential of the output terminal of the second sample-and-hold circuit 711, specifically, the potential of the S signal, and R is the resistance value of the variable resistor element 740.

$$I=(Vn-Vs)/R \quad \text{(Equation 1).}$$

The current I is input to the conversion portion 799. At this time, the current I flowing through the variable resistor element 740 is proportional to a difference between the potential Vn of the N signal and the potential Vs of the S signal of the pixel signal, as expressed by formula 1. This indicates that correlated double sampling (CDS) is performed at the time of inputting the current I to the conversion portion 799. The determination circuit 600 determines the magnitude of the voltage value (signal amplitude value) of the pixel signal and controls the resistance value of the variable resistor element 740 based on a determination result. Such a drive enables the gain amount to be applied to the pixel signal that is input to the conversion portion 799 to be variable.

The conversion portion 799 is an oversampling type AD conversion circuit, such as ΔΣ type AD conversion circuit. The ΔΣ type AD conversion circuit includes a first integrator, a second integrator, a quantizer 790, and a decimation filter 795. In the conversion portion 799, the first integrator includes an integrating capacitor 760. The second integrator includes a voltage current conversion circuit (Gm cell) 765 and an integrating capacitor 785. The voltage current conversion circuit 765 converts voltage into current. An AD converter 750 including a current source 745 and a switch 755 is connected to an input node of the first integrator.

The AD converter 750 controls the current to the first integrator based on a digital signal through the second integrator and the quantizer 790. An AD converter 775 including a current source 770 and a switch 780 is connected to an input node of the second integrator. The AD converter 775 controls the current to the second integrator based on the result of quantizing the output of the second integrator by the quantizer 790.

In the conversion portion 799, the quantizer 790 performs an operation of feeding a previous quantized value back to the second integrator and the first integrator through the AD converters 750 and 775. The previous quantized value is thus passed through the integrator twice while being fed back to the AD converters 750 and 775, so that second-order noise shaping characteristics are obtained. Furthermore, removing high-frequency noise with the decimation filter 795 placed after the quantizer 790 results in achievement of a high-accuracy AD conversion output.

Figure 18A:
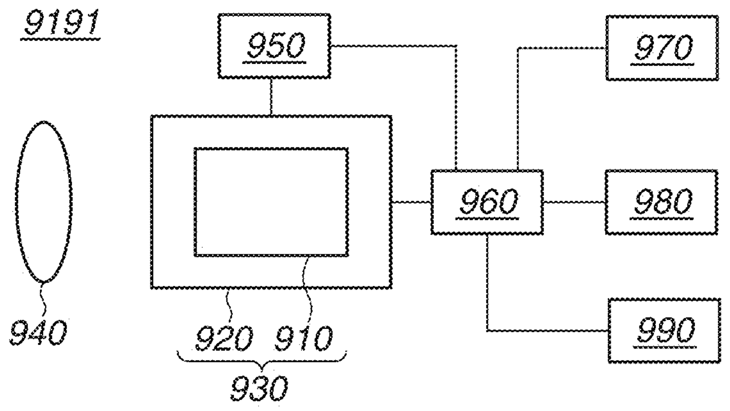
FIGS. 18A, 18B, and 18C are schematic diagrams illustrating equipment according to one or more aspects of the present disclosure.

A seventh exemplary embodiment of the present invention will be described below. The seventh exemplary embodiment is applicable to the first to sixth exemplary embodiments. FIG. 18A is a schematic diagram illustrating equipment 9191 including a semiconductor apparatus 930 according to the present exemplary embodiment. The semiconductor apparatus 930 may use the photoelectric conversion apparatus (imaging apparatus) according to any of the exemplary embodiments described above. The equipment 9191 including the semiconductor apparatus 930 will be described in detail below. The semiconductor apparatus 930 may include a semiconductor device 910. The semiconductor apparatus 930 may also include a package 920 for storing the semiconductor device 910, in addition to the semiconductor device 910. The package 920 may include a base member and a lid member, such as a glass. The semiconductor device 910 is fixed to the base member, and the lid member faces the semiconductor device 910. The package 920 may further include a joint member, such as bonding wires and bumps, for connecting terminals provided to the base member and terminals provided to the semiconductor device 910.

The equipment 9191 may include at least one of an optical apparatus 940, a control apparatus 950, a processing apparatus 960, a display apparatus 970, a storage apparatus 980, and a mechanical apparatus 990. The optical apparatus 940 corresponds to the semiconductor apparatus 930. The optical apparatus 940 includes an optical system, such as a lens, a shutter, and a mirror, for guiding light to the semiconductor apparatus 930. The control apparatus 950 controls the semiconductor apparatus 930. The control apparatus 950 is, for example, a semiconductor apparatus such as an application-specific integrated circuit (ASIC).

The processing apparatus 960 processes signals output from the semiconductor apparatus 930. The processing apparatus 960 is a semiconductor apparatus such as a central processing unit (CPU) or an ASIC for configuring an analog front end (AFE) or a digital front end (DFE). The display apparatus 970 is an electroluminescent (EL) display apparatus or a liquid crystal display apparatus that displays information (image) acquired by the semiconductor apparatus 930. The storage apparatus 980 is a magnetic device or a semiconductor device that stores information (image) acquired by the semiconductor apparatus 930. The storage apparatus 980 is a volatile memory, such as a static random access memory (SRAM) or a dynamic random access memory (DRAM), or a non-volatile memory, such as a flash memory or a hard disk drive.

The mechanical apparatus 990 includes a moving part or a propulsion part, such as a motor or an engine. In the equipment 9191, a signal output from the semiconductor apparatus 930 is displayed on the display apparatus 970 or transmitted to the outside via a communication apparatus (not illustrated) of the equipment 9191. Thus, it is desirable that the equipment 9191 include the storage apparatus 980 and the processing apparatus 960 separately from a storage circuit and an arithmetic circuit of the semiconductor apparatus 930. The mechanical apparatus 990 may be controlled based on a signal output from the semiconductor apparatus 930.

The equipment 9191 is applicable to electronic equipment such as an information terminal (e.g., smartphone, wearable terminal) with an imaging function or a camera (e.g., interchangeable lens camera, compact camera, video camera, surveillance camera). The mechanical apparatus 990 of a camera is capable of driving components of the optical apparatus 940 for zooming, focusing, and shutter operations. Further, the mechanical apparatus 990 of a camera is capable of moving the semiconductor apparatus 930 for vibration prevention.

The equipment 9191 may be transport equipment, such as a vehicle, vessel, or aircraft (drone, airplane). The mechanical apparatus 990 of transport equipment may be used as a moving apparatus. The equipment 9191 as transport equipment is suitable for transport equipment that transports the semiconductor apparatus 930 or transport equipment that provides driving (piloting) assistance and/or implements autonomous driving (piloting) using an imaging function. The processing apparatus 960 for providing driving (piloting) assistance and/or implementing autonomous driving (piloting) is capable of performing a process for operating the mechanical apparatus 990 as a moving apparatus based on information acquired by the semiconductor apparatus 930. Further, the equipment 9191 may be medical equipment, such as an endoscope, measurement equipment, such as a distance measurement sensor, analytical equipment, such as an electron microscope, office equipment, such as a copying machine, or industrial equipment, such as a robot.

The above-described exemplary embodiment makes it possible to obtain excellent pixel characteristics. This makes it possible to enhance the value of the semiconductor apparatus 930. The enhancement of the value herein refers to at least one of the addition of a function, improvement of performance, improvement of a characteristic, improvement of reliability, improvement of manufacturing yield, environmental load reduction, cost reduction, size reduction, and weight reduction.

Thus, use of the semiconductor apparatus 930 according to the present exemplary embodiment in the equipment 9191 also makes it possible to improve the value of the equipment 9191. For example, the semiconductor apparatus 930 may be installed in transport equipment, which makes it possible to obtain excellent performance in imaging the outside of the transport equipment or measuring an external environment. Therefore, from the perspective of enhancing the performance of transport equipment itself, it is advantageous to determine to install the semiconductor apparatus 930 according to the present exemplary embodiment in the transport equipment during manufacturing and sales. The semiconductor apparatus 930 is especially suitable for transport equipment that provides driving assistance and/or implements autonomous driving using information acquired by a semiconductor apparatus.

A photoelectric conversion system and a movable object according to the present exemplary embodiment will be described below with reference to FIGS. 18B and 18C.

Figure 18B:
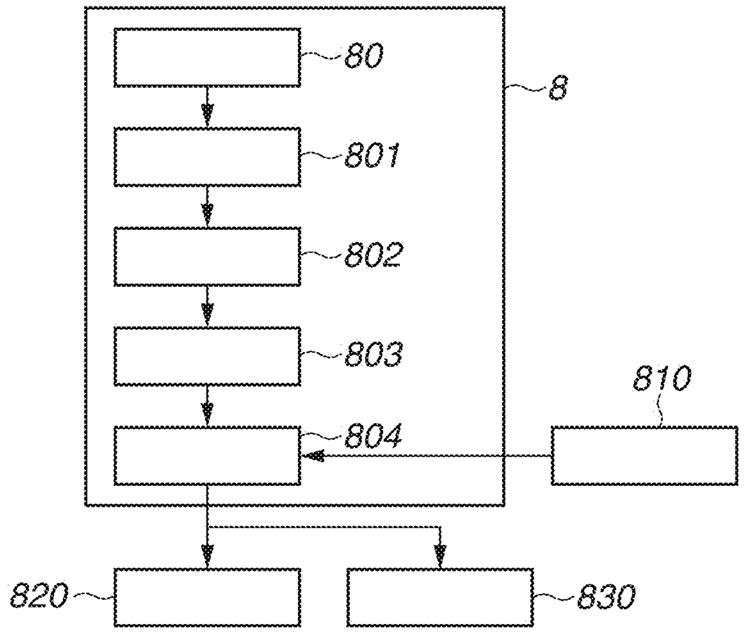

FIG. 18B illustrates an example of a photoelectric conversion system that relates to an on-vehicle camera. A photoelectric conversion system 8 includes a photoelectric conversion apparatus 80. The photoelectric conversion apparatus 80 is the photoelectric conversion apparatus (imaging apparatus) according to one of the above-described exemplary embodiments. The photoelectric conversion system 8 includes an image processing unit 801 and a parallax acquisition unit 802. The image processing unit 801 performs image processing on a plurality of pieces of image data acquired by the photoelectric conversion apparatus 80, and the parallax acquisition unit 802 calculates a parallax (phase difference of parallax image) from the plurality of pieces of image data acquired by the photoelectric conversion system 8. The photoelectric conversion system 8 herein may include, for example, an optical system (not illustrated), such as a lens, a shutter, and a mirror, for guiding light to the photoelectric conversion apparatus 80.

A plurality of photoelectric conversion elements nearly conjugate to a pupil of the optical system may be arranged within the pixels of the photoelectric conversion apparatus 80. For example, the plurality of photoelectric conversion elements nearly conjugate to the pupil is arranged to correspond to one microlens. The plurality of photoelectric conversion elements receives light beams transmitted through different positions of the pupil of the optical system, and the photoelectric conversion apparatus 80 outputs image data corresponding to the light beams transmitted through the different positions. The parallax acquisition unit 802 may calculates a parallax using the output image data. The photoelectric conversion system 8 includes a distance acquisition unit 803 and a collision determination unit 804. The distance acquisition unit 803 calculates a distance to a target object based on the calculated parallax, and the collision determination unit 804 determines whether there is a possibility of collision based on the calculated distance. The parallax acquisition unit 802 and the distance acquisition unit 803 herein are an example of a distance information acquisition unit configured to acquire distance information to a target object. Specifically, the distance information refers to parallax information, defocus amount information, and information about a distance to a target object. The collision determination unit 804 may determine whether there is a possibility of collision using any of the distance information described above. The distance information may be acquired using Time of Flight (ToF). The distance information acquisition unit may be realized by dedicated hardware or software modules. The distance information acquisition unit may be realized by a field programmable gate array (FPGA), an ASIC, or a combination thereof. The photoelectric conversion system 8 is connected to a vehicle information acquisition apparatus 810 and is capable of acquiring vehicle information, such as a vehicle speed, yaw rate, and steering angle. A control engine control unit (control ECU) 820 is connected to the photoelectric conversion system 8. The control ECU 820 is a control apparatus that outputs control signals for generating braking force on a vehicle based on the determination result of the collision determination unit 804, and. The photoelectric conversion system 8 is also connected to an alarm apparatus 830. The alarm apparatus 830 issues alarms to a driver based on the determination result of the collision determination unit 804. For example, in a case where the determination result of the collision determination unit 804 indicates that there is a high possibility of collision, the control ECU 820 performs vehicle control to avoid collision and reduce damage by applying a brake, releasing an accelerator, or suppressing engine output. The alarm apparatus 830 issues an alarm to a user by sounding an alarm, such as a sound, displaying alarm information on a screen of a car navigation system, or applying vibration to a seatbelt and steering.

According to the present exemplary embodiment, the photoelectric conversion system 8 captures images of an area around a vehicle, such as an area in front of or behind the vehicle.

Figure 18C:
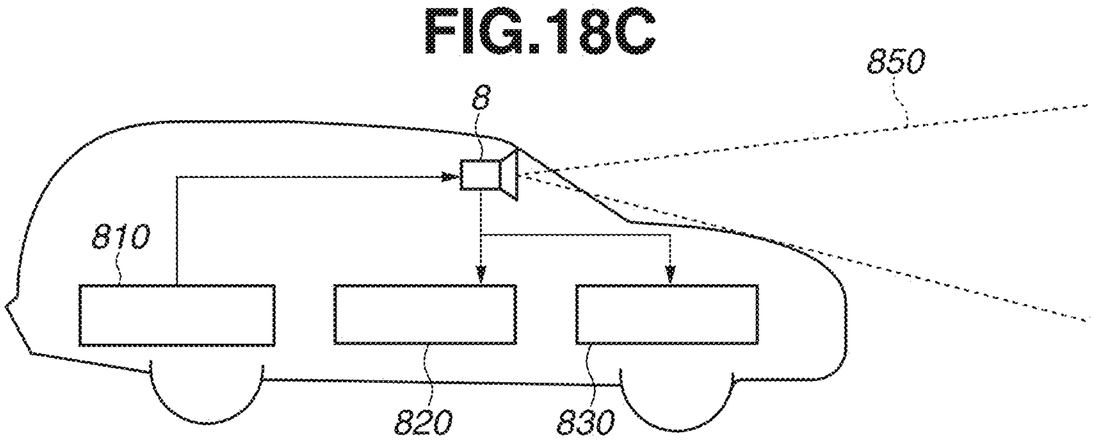

FIG. 18C illustrates the photoelectric conversion system 8 in the case of capturing images of the area (image capturing range 850) in front of the vehicle. The vehicle information acquisition apparatus 810 transmits instructions to the photoelectric conversion system 8 or the photoelectric conversion apparatus 80. The foregoing configuration makes it possible to further improve the distance measurement accuracy.

While the control for avoiding collisions with other vehicles is described above as an example, the photoelectric conversion system 8 is also applicable to the control for autonomous driving that follows other vehicles and the control for autonomous driving that avoids extending beyond lanes. Further, the photoelectric conversion system 8 is applicable to not only vehicles, such as automobiles, but also movable objects (moving apparatuses), such as vessels, aircraft, or industrial robots. Furthermore, the photoelectric conversion system 8 is also applicable to not only movable objects but also equipment that widely uses object recognition, such as an intelligent transportation system (ITS).

In the present specification, unless explicitly defined otherwise, the expressions "A or B", "at least one of A and B", "at least one of A or/and B", and "one or more of A or/and B" encompass all possible combinations of the listed items. Specifically, it is understood that the expressions disclose all of cases where at least one A is included, cases where at least one B is included, and cases where at least one A and at least one B are both included. The same applies to combinations of three or more elements.

The above-described exemplary embodiments can be changed as appropriate within a range that does not deviate from the technical concept. The disclosure in the present specification encompasses not only the information described in the present specification but also all matters that can be understood from the present specification and the drawings attached to the present specification. Further, the disclosure in the present specification encompasses the complement of the concepts described in the present specification. Specifically, if, for example, the present specification includes the phrase "A is greater than B", it can be inferred that the present specification discloses "A is not greater than B", even if the phrase "A is not greater than B" is not explicitly stated, because the inclusion of the phrase "A is greater than B" presumes that the case where "A is not greater than B" has been considered.

The present disclosure makes it possible to output high-quality signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-201979, filed Nov. 29, 2023, which is hereby incorporated by reference herein in its entirety.

What is claimed is:

1. A method of driving a photoelectric conversion apparatus including a pixel, an output line, and a current source, the pixel including a photoelectric conversion element configured to generate a charge based on incident light, a floating diffusion region, and a transfer transistor configured to transfer the charge to the floating diffusion region, the output line being configured to be electrically connected to the pixel and output a pixel signal based on the charge, the current source being configured to be electrically connected to the output line and supply current to the output line, the method comprising:

setting the transfer transistor to an on state to transfer the charge to the floating diffusion region at a first timing;

completing, at a second timing, a comparison of the pixel signal and a threshold voltage, based on the charge transferred to the floating diffusion region at the first timing;

selecting a reference signal for use in analog-to-digital (AD) conversion of the pixel signal based on a result of the comparison, or selecting a gain to be applied to the pixel signal based on the result of the comparison; and performing a first drive to change a connection state between the pixel and the current source from a conductive state to a non-conductive state between the first timing and the second timing.

2. The method of driving the photoelectric conversion apparatus according to claim 1, wherein the transfer transistor is set to an off state at a third timing between the first timing and the second timing, and the first drive is performed between the first timing and the third timing.

3. The method of driving the photoelectric conversion apparatus according to claim 1, wherein, after the first drive is performed between the first timing and the second timing, the connection state between the pixel and the current source is changed from the non-conductive state to the conductive state between the first timing and the second timing.

4. The method of driving the photoelectric conversion apparatus according to claim 3, wherein the photoelectric conversion apparatus includes a first operation mode in which a first current is supplied from the current source and a second operation mode in which a second current higher than the first current is supplied from the current source, and wherein a period during which the connection state between the pixel and the current source is the non-conductive state in the first operation mode is longer than a period during which the connection state between the pixel and the current source is the non-conductive state in the second operation mode.

5. The method of driving the photoelectric conversion apparatus according to claim 3, wherein the photoelectric conversion apparatus includes a plurality of comparators configured to be electrically connected to the output line and includes a plurality of operation modes that differs in a number of comparators configured to be electrically connected to the output line, and wherein the number of comparators configured to be electrically connected to the output line in a first operation mode among the plurality of operation modes is greater than the number of comparators configured to be electrically connected to the output line in a second operation mode among the plurality of operation modes, and a period during which the connection state between the pixel and the current source is the non-conductive state in the first operation mode is longer than a period during which the connection state between the pixel and the current source is the non-conductive state in the second operation mode.

6. The method of driving the photoelectric conversion apparatus according to claim 1, wherein the photoelectric conversion apparatus includes a comparator configured to perform the comparison of the pixel signal and the threshold voltage, and wherein a path through which a power supply voltage is supplied to the pixel differs from a path through which a power supply voltage is supplied to the comparator.

7. The method of driving the photoelectric conversion apparatus according to claim 1, wherein the photoelectric conversion apparatus includes the pixel including a transistor configured to be electrically connected to the output line, and wherein the first drive is performed by setting the transistor to an off state.

8. The method of driving the photoelectric conversion apparatus according to claim 1, wherein the photoelectric conversion apparatus includes the output line including a switch between the pixel and the current source, and wherein the first drive is performed by setting the switch to an off state.

9. The method of driving the photoelectric conversion apparatus according to claim 1, wherein the photoelectric conversion apparatus includes another output line that is different from the output line and is configured to be electrically connected to the current source, and wherein, after the first drive is performed using the output line, the first drive is performed using the other output line.

10. A method of driving a photoelectric conversion apparatus including a pixel, an output line, and an accelerating circuit, the pixel including a photoelectric conversion element configured to generate a charge based on incident light, a floating diffusion region, and a transfer transistor configured to transfer the charge to the floating diffusion region, the output line being configured to be electrically connected to the pixel and output a pixel signal based on the charge, and the accelerating circuit being configured to be electrically connected to the output line and accelerate stabilization of a voltage value of the output line, the method comprising:

setting the transfer transistor to an on state to transfer the charge to the floating diffusion region at a first timing;

completing, at a second timing, a comparison of the pixel signal and a threshold voltage, based on the charge transferred to the floating diffusion region at the first timing; and outputting the pixel signal from the output line between the first timing and the second timing as the accelerating circuit operates.

11. The method of driving the photoelectric conversion apparatus according to claim 10, wherein the photoelectric conversion apparatus includes a comparator configured to perform the comparison of the pixel signal and the threshold voltage, and wherein a path through which a power supply voltage is supplied to the pixel differs from a path through which a power supply voltage is supplied to the comparator.

12. The method of driving the photoelectric conversion apparatus according to claim 10, wherein a connection state between the accelerating circuit and the output line is changed from a non-conductive state to a conductive state between the first timing and the second timing.

13. The method of driving the photoelectric conversion apparatus according to claim 12, wherein the accelerating circuit includes a current source configured to be electrically connected to the output line and a switch between the output line and the current source.

14. The method of driving the photoelectric conversion apparatus according to claim 10, wherein the accelerating circuit includes a capacitive element configured to be electrically connected to the output line and an amplifier between the output line and the capacitive element.

15. A method of driving a photoelectric conversion apparatus including a pixel, an output line, and a restriction circuit, the pixel including a photoelectric conversion element configured to generate a charge based on incident light, a floating diffusion region, and a transfer transistor configured to transfer the charge to the floating diffusion region, the output line being configured to be electrically connected to the pixel and output a pixel signal based on the charge, and the restriction circuit being configured to be electrically connected to the output line and restrict a range within which a voltage of the output line is allowed to vary, the method comprising:

setting the transfer transistor to an on state to transfer the charge to the floating diffusion region at a first timing;

completing, at a second timing, a comparison of the pixel signal and a threshold voltage, based on the charge transferred to the floating diffusion region at the first timing; and changing a state of the restriction circuit from a non-operating state to an operating state between the first timing and the second timing.

16. A photoelectric conversion apparatus, comprising:

a pixel including a photoelectric conversion element configured to generate a charge based on incident light, a floating diffusion region, and a transfer transistor configured to transfer the charge to the floating diffusion region;

an output line configured to be electrically connected to the pixel and output a pixel signal based on the charge;

a current source configured to be electrically connected to the output line and supply current to the output line; and a control circuit configured to control a connection state between the pixel and the current source, wherein the transfer transistor is set to an on state to transfer the charge to the floating diffusion region at a first timing;

wherein, at a second timing, a comparison of the pixel signal and a threshold voltage is completed based on the charge transferred to the floating diffusion region at the first timing;

selecting a reference signal for use in analog-to-digital (AD) conversion of the pixel signal based on a result of the comparison, or selecting a gain to be applied to the pixel signal based on the result of the comparison; and performing a first drive of changing the connection state between the pixel and the current source from a conductive state to a non-conductive state between the first timing and the second timing.

17. A system comprising:

a photoelectric conversion apparatus, including:

a pixel including a photoelectric conversion element configured to generate a charge based on incident light, a floating diffusion region, and a transfer transistor configured to transfer the charge to the floating diffusion region;

an output line configured to be electrically connected to the pixel and output a pixel signal based on the charge;

a current source configured to be electrically connected to the output line and supply current to the output line; and a control circuit configured to control a connection state between the pixel and the current source, wherein the transfer transistor is set to an on state to transfer the charge to the floating diffusion region at a first timing;

wherein, at a second timing, a comparison of the pixel signal and a threshold voltage is completed based on the charge transferred to the floating diffusion region at the first timing;

selecting a reference signal for use in analog-to-digital (AD) conversion of the pixel signal based on a result of the comparison, or selecting a gain to be applied to the pixel signal based on the result of the comparison; and performing a first drive of changing the connection state between the pixel and the current source from a conductive state to a non-conductive state between the first timing and the second timing;

an optical apparatus configured to guide light to the photoelectric conversion apparatus;

a control apparatus configured to control the photoelectric conversion apparatus;

a processing apparatus configured to process a signal output from the photoelectric conversion apparatus;

a display apparatus configured to display information acquired by the photoelectric conversion apparatus;

a storage apparatus configured to store the information acquired by the photoelectric conversion apparatus; and a mechanical apparatus configured to operate based on the information acquired by the photoelectric conversion apparatus.

* * * * *